US012438576B2

(12) United States Patent
Oteri et al.

(10) Patent No.: US 12,438,576 B2
(45) Date of Patent: *Oct. 7, 2025

(54) SYSTEMS AND METHODS FOR SINGLE USER HYBRID MIMO FOR mmWave WIRELESS NETWORKS

(71) Applicant: InterDigital Patent Holdings, Inc., Wilmington, DE (US)

(72) Inventors: Oghenekome Oteri, San Diego, CA (US); Alphan Sahin, Westbury, NY (US); Hanqing Lou, Syosset, NY (US); Joseph Levy, Merrick, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,481

(22) Filed: Jun. 12, 2023

(65) Prior Publication Data

US 2023/0336231 A1    Oct. 19, 2023

Related U.S. Application Data

(63) Continuation of application No. 16/099,928, filed as application No. PCT/US2017/032270 on May 11, 2017, now Pat. No. 11,722,198.
(Continued)

(51) Int. Cl.
H04B 7/06    (2006.01)
H04B 7/0417    (2017.01)
(Continued)

(52) U.S. Cl.
CPC ........ *H04B 7/0695* (2013.01); *H04B 7/0417* (2013.01); *H04B 7/0452* (2013.01);
(Continued)

(58) Field of Classification Search
USPC ........................................................ 370/329
See application file for complete search history.

(56) References Cited

U.S. PATENT DOCUMENTS 9,226,316 B2    12/2015 Cordeiro et al.
9,853,702 B1    12/2017 Liang et al.
(Continued)

OTHER PUBLICATIONS

LG Electronics,On the consideration of DL L1/L2 control channel design for MIMO, 3GPP Tdoc R1-072344; 3GPP TSG RAN WG1 Meeting #49; Kobe, Japan, May 7-11, 2007, 5 pages.
(Continued)

*Primary Examiner* — Jeffrey M Rutkowski
*Assistant Examiner* — Luna Weissberger
(74) *Attorney, Agent, or Firm* — Majid Albassam

(57) ABSTRACT

Systems and methods are provided to implement features in the IEEE 802.11ad+/ay protocols by utilizing combinations of analog and digital precoding (such as hybrid mmWave precoding) to enable multi-stream/multi-user transmissions. These systems and methods are also suitable for 5G wireless networks, such as found in 3GPP. These systems and methods address performing general precoder design, reducing of beam-training overhead with leak wave antennas, performing single-stage approximate precoding with enhanced SLS for SU-MIMO transmissions (eSLS1), performing multistage approximate precoding with enhanced SLS for SU-MIMO transmissions (eSLS2), and performing exact precoding with enhanced SLS for SU-MIMO transmissions.

20 Claims, 41 Drawing Sheets

Related U.S. Application Data

(60) Provisional application No. 62/501,625, filed on May 4, 2017, provisional application No. 62/471,220, filed on Mar. 14, 2017, provisional application No. 62/365,283, filed on Jul. 21, 2016, provisional application No. 62/335,515, filed on May 12, 2016.

(51) Int. Cl.
    *H04B 7/0452* (2017.01)
    *H04B 7/0456* (2017.01)
    *H04B 7/10* (2017.01)

(52) U.S. Cl.
    CPC ......... *H04B 7/0456* (2013.01); *H04B 7/0617* (2013.01); *H04B 7/10* (2013.01)

(56) References Cited

U.S. PATENT DOCUMENTS

| | | | |
|---|---|---|---|
| 2012/0087316 A1 | 4/2012 | Merlin et al. | |
| 2012/0314667 A1 | 12/2012 | Taoka et al. | |
| 2013/0286959 A1* | 10/2013 | Lou | H04W 72/04 370/329 |
| 2013/0301454 A1* | 11/2013 | Seol | H04B 7/0695 370/252 |
| 2014/0050280 A1 | 2/2014 | Stirling-Gallacher et al. | |
| 2015/0208400 A1 | 7/2015 | Li et al. | |
| 2015/0256246 A1 | 9/2015 | Ishihara et al. | |
| 2015/0289147 A1 | 10/2015 | Lou et al. | |
| 2016/0021548 A1 | 1/2016 | Raghavan et al. | |
| 2016/0080051 A1 | 3/2016 | Sajadieh et al. | |
| 2017/0079031 A1* | 3/2017 | Maltsev, Jr. | H04B 7/0452 |
| 2019/0075526 A1 | 3/2019 | Nagaraj et al. | |
| 2019/0341975 A1 | 11/2019 | Yun et al. | |

OTHER PUBLICATIONS

Oteri, Kome, et al., "Protocols for Hybrid Beamforming in 802.11ay", IEEE 802.11-17/0429r4, Mar. 12, 2017, 14 pages.

Agilent Technologies, "Wireless LAN at 60 GHz—IEEE 802.11ad Explained, Application Notes" published by Agilent Technologies, May 30, 2013, 28 pages.

3rd Generation Partnership Project; Technical Specification Group Radio Access Network; Scenarios and Requirements for Next Generation Access Technologies; (3GPP name for next generation radio access); (Release 14), 3GPP TR 38.913 V0.0.3, Jan. 2016, 16 pages.

Fellhauer, Felix et al., Low Complexity Beamtraining for Hybrid MIMO, IEEE 802.11-16/0316r0, IEEE, Internet, URL: https://mentor.ieee.org/802.11/dcn/16/11-16-0316-00-00ay-low-complexity-beamtraining-for-hybrid-mimo.pptx, Mar. 13, 2016, 19 pages.

Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011), 263 pages.

Dave Halasz, "Sub 1 GHz license-exempt PAR and 5C", IEEE 802.11-10/0001r13, Jul. 2010, 7 pages.

Ahmed Alkhateeb Et Al.,MIMO Precoding and Combining Solutions for Millimeter-Wave Systems, IEEE Communications Magazine, Dec. 2014, 10 pages.

Oteri, Kome, et al., "Further Discussion on Beam Tracking for 802.11ay", IEEE 802.11-17/0426r2, Mar. 12, 2017, 21 pages.

Oteri, Kome, et al., "Protocols for Hybrid Beamforming in 802.11ay", IEEE 802.11-17/0429r0, Mar. 12, 2017, 9 pages.

Technicolor, MAC and PHY Proposal for 802.11af, IEEE Standard 802.11-10/0258r0, Mar. 2010, 23 pages.

"Part 11: Wireless LAN Medium Access Control (MAC) and Physical Layer (PHY) Specifications", IEEE Standards Association; 802.11-2012, Mar. 29, 2012, 2793 pages.

Part 11: Wireless LAN Medium Access Control (MAC) and Physical Layer (PHY) Specifications, Amendment 3: Enhancements for Very High Throughput in the 60 GHz Band, IEEE Standards Association; 802.11ad-2012, Dec. 28, 2012, 628 pages.

Wang, James, "11ay DL MU-MIMO BF Training and User Selection," IEEE 802.11-16/0405r1, IEEE, Internet <URL: https://mentor.ieee.org/802.11/dcn/16/11-16-0405-01-00ay-11ay-dl-mu-mimo-bf-training-and-user-selection.pptx>, Mar. 14, 2016, 17 pages.

"IEEE 802.11 TGay Use Cases", IEEE 802.11-2015/0625r2, May 2015, 21 pages.

Wang, James, "11ay MIMO BFTraining Enhancements", IEEE 802.11-16/0100r3, Jan. 2016.

\* cited by examiner

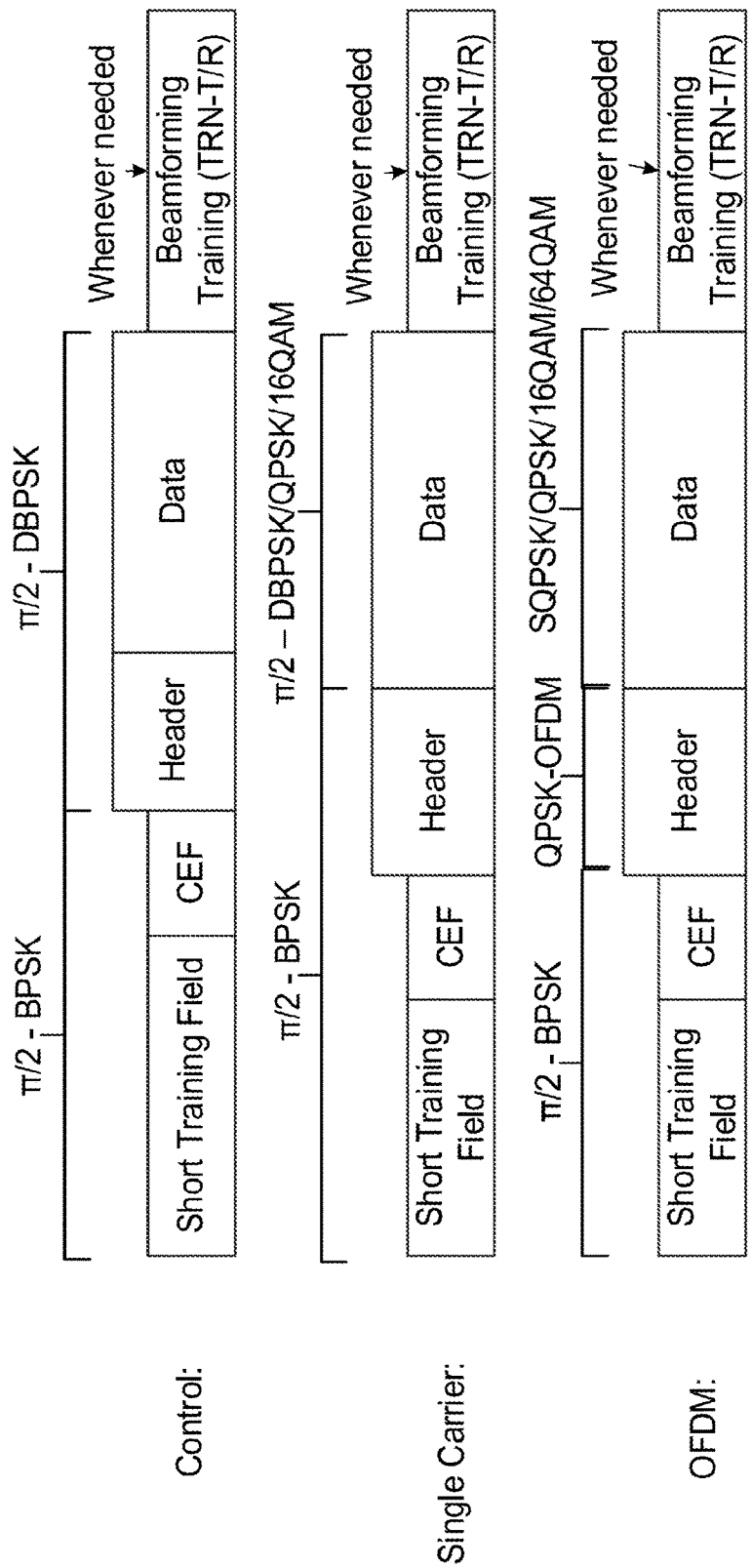
FIG. 2
FIG. 3

FIG. 7A

SSW-FEEDBACK-FIELD FORMAT
(WHEN TRANSMITTED AS PART OF AN ISS)

| [B0] TOTAL SECTORS IN ISS | [B8] [B9] NUMBER OF RX DMG ANTENNAS | [B10] [B11] [B15] RESERVED | [B16] POLL REQUIRED | [B17] [B23] RESERVED |
|---|---|---|---|---|
| 9 | 2 | 5 | 1 | 7 |

OF BITS:

FIG. 7B

SSW-FEEDBACK-FIELD FORMAT
(WHEN NOT TRANSMITTED AS PART OF AN ISS)

| [B0] SECTOR SELECT | [B5] [B6] DMG ANTENNA SELECT | [B7] [B8] SNR REPORT | [B15] [B16] POLL REQUIRED | [B17] [B23] RESERVED |
|---|---|---|---|---|
| 6 | 2 | 8 | 1 | 7 |

OF BITS:

| L-STF | L-CEF | L-Header | EDMG-Header-A | EDGM-STF | EDGM-CEF | EDGM-Header-B | Data | AGC | TRN |

FIG. 9

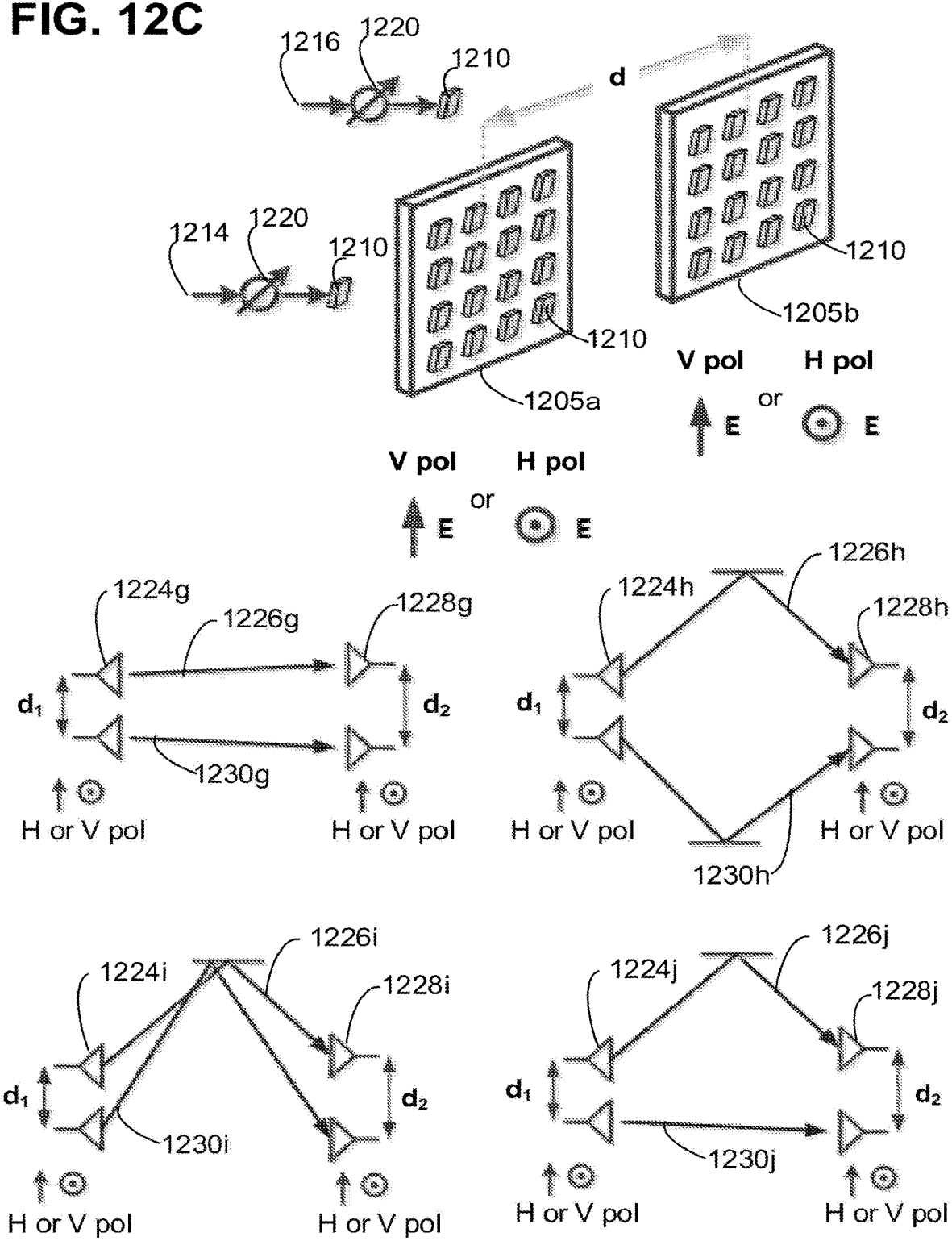

| Field | Description | Size | Comments |
|---|---|---|---|
| Element ID | | | |
| Length | | | |
| SNR | SNR1_eff; SNR2_eff; ...; SNRN_eff; Cap_eff1 | | Optional |
| Channel Measurement / Precoder Estimate | Chan Meas 1 | Ntaps x N_tx_beams x N_rx_beams x 16 bits | channel measurement |
| Tap Delay | relative delay 1 | 8 bits | |
| | relative delay 2 | 8 bits | |
| | ... | | |
| | relative delay (Ntaps) | | |

Optional MIMO channel element complex feedback based on BRP feedback element

FIG. 18

Stage 1 feedback: Sector Select 1 | DMG Antenna Select 1 | SNR Report 1 Scalar/Vector | Complex Channel 1 scalar | Poll Required | Reserved

Stage 2 feedback: Sector Select 1 | DMG Antenna Select 1 | SNR Report 1 Scalar/Vector | Complex Channel 1 scalar | Complex Channel 1 vector | Sector Select 2 | DMG Antenna Select 2 | SNR Report 2 Scalar/Vector | Complex Channel 2 (vector) | Poll Required | Reserved

Stage 3 feedback: Sector Select 1 | DMG Antenna Select 1 | SNR Report 1 Scalar/Vector | Complex Channel 1 vector | Sensor Select 2 | DMG Antenna Select 2 | SNR Report 2 Scalar/Vector | Complex Channel 2 vector | Sensor Select 3 | DMG Antenna Select 3 | SNR Report 3 Scalar/Vector | Complex Channel 3 vector | Poll Required | Reserved

FIG. 20

| Requested BRP SC Blocks | MU-MIMO Supported | SU-MIMO Supported | Grant Required | NoRSS Supported | SU-MIMO HB Beamforming | MU-MIMO HB Beamforming | Reserved |
|---|---|---|---|---|---|---|---|

FIG. 29

| Requested BRP SC Blocks | MU-MIMO Supported | SU-MIMO Supported | Grant Required | NoRSS Supported | HB Beamforming | Reserved |
|---|---|---|---|---|---|---|

| MU-MIMO Selection Frame | HB | BB Sounding/Training Request | SU/MU Beam | Feedback Type | Padding: For Start |

FIG. 32

| HB | BB Sounding/Training Request | SU/MU Beam | Feedback Type | Padding: For Start | CEF/TRN |

FIG. 33

| MU-MIMO Selection Frame | HB | BB Sounding/Training Request | SU/MU Beam | Feedback Type | Padding: For Start | CEF/TRN |

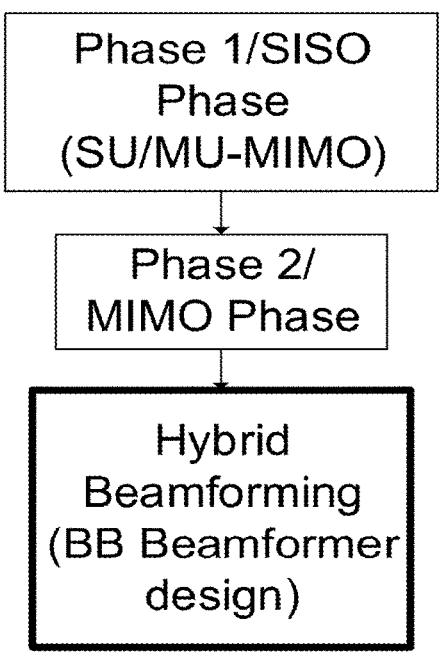
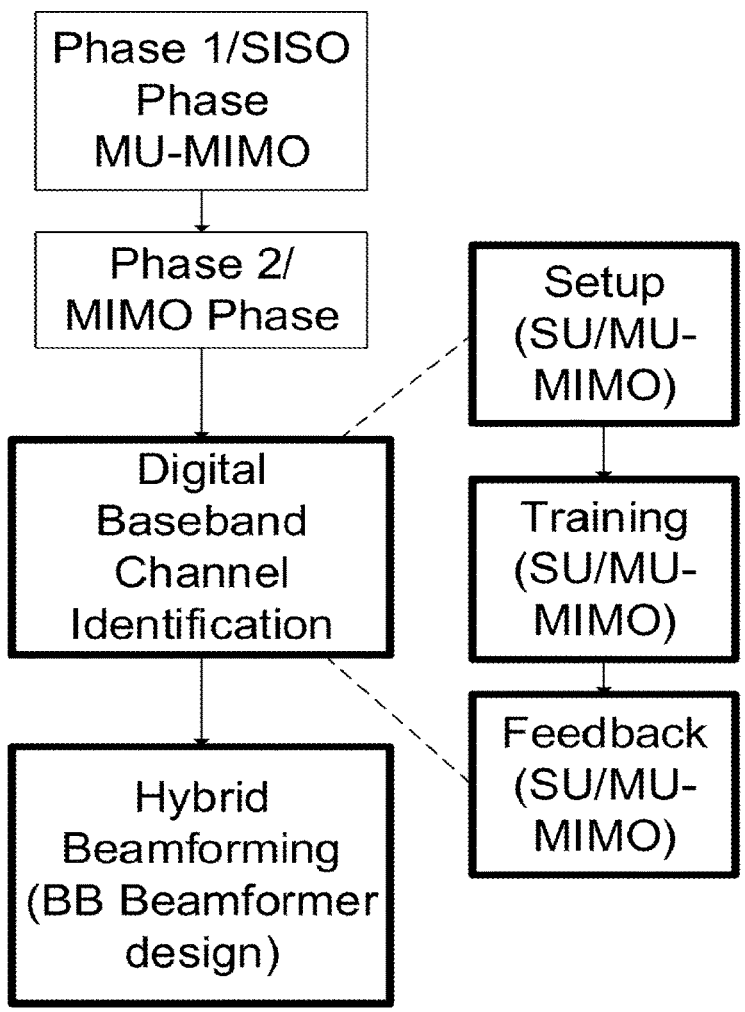
FIG. 34
FIG. 35

| [B0] [B4] | [B5] | [B6] | [B7] | [B8] | [B9] | [B10] [B15] |
|---|---|---|---|---|---|---|
| REQUESTED BRP SC BLOCKS | MU-MIMO SUPPORTED | SU-MIMO SUPPORTED | GRANT REQUIRED | NORSS SUPPORTED | HYBRID BEAMFORMING SUPPORTED | RESERVED |
| 5 | 1 | 1 | 1 | 1 | 1 | 6 |

OF BITS

FIG. 39

SYSTEMS AND METHODS FOR SINGLE USER HYBRID MIMO FOR mmWave WIRELESS NETWORKS

CROSS-REFERENCE TO RELATED APPLICATIONS

This application is a continuation of U.S. application Ser. No. 16/099,928, filed Nov. 8, 2018, which is a U.S. National Stage Application filed under 35 U.S.C. 371 of International Application No. PCT/US2017/032270, filed May 11, 2017, and claims the benefit of U.S. Provisional Patent Application Ser. No. 62/335,515, filed May 12, 2016, U.S. Provisional Patent Application Ser. No. 62/365,283, filed Jul. 21, 2016, U.S. Provisional Patent Application Ser. No. 62/471,220, filed Mar. 14, 2017, and U.S. Provisional Patent Application Ser. No. 62/501,625, filed May 4, 2017, each of which is incorporated herein by reference in its entirety.

TECHNICAL FIELD

This disclosure relates to systems and methods for beamforming training in wireless local area networks (WLANs), such as Institute of Electrical and Electronics Engineers (IEEE) 802.11ay WLANs.

BACKGROUND

Countless devices and networks around the globe operate according to one or more IEEE 802.11 standards for engaging in wireless communications. These communications typically occur in the 2.4-GHz and 5-GHz bands, though other bands are used as well.

In traditional MIMO transmission with precoder design, the precoder is designed based on the actual MIMO channel between the transmitter and receiver. With mmWave MIMO transmission, current hybrid precoders estimate the desired precoder from the RF channel and then design a combined RF and baseband precoder that minimizes the difference between the desired precoder and the combined precoders. Further simplifications to the precoder design may be possible based on the separation of the single precoder into an RF and base-band precoders.

Current beamforming training mechanisms may allow various search algorithms for beam training and sector sweep mechanisms. However, such search algorithms increase beam training overhead in the system.

In mm Wave transmission, an initial beam sweep may be performed to enable the transmitter and receiver communicate. This is called the sector level sweep in 802.11ad (a similar transmitter and receiver sector selection procedure may be used in 5G networks). Enhanced sector level sweep procedures are needed to enable both simplified and exact precoder design.

The systems and methods disclosed herein address these issues, and others.

SUMMARY

This specification describes systems and methods relating to IEEE 802.11ad+/ay that utilize combinations of analog and digital precoding (such as hybrid mmWave precoding) to enable multi-stream/multi-user transmissions. It also presents ideas suitable for 5G wireless networks, such as found in 3GPP. This specification presents multiple exemplary embodiments for simplified precoder designs, beam training overhead, and sector sweep methods for mm Wave precoding.

The specification also presents methods to perform general precoder design, to reduce beam-training overhead with leak wave antennas, to perform single-stage approximate precoding with enhanced SLS for SU-MIMO transmissions (eSLS1), to perform multi-stage approximate precoding with enhanced SLS for SU-MIMO transmissions (eSLS2), and to perform exact precoding with enhanced SLS for SU-MIMO transmissions.

BRIEF DESCRIPTION OF THE DRAWINGS

A more detailed understanding may be had from the following description, presented by way of example in conjunction with the accompanying drawings.

FIG. 2 depicts a message structure for PPDU messages under different modulation schemes.

FIG. 3 depicts a block diagram for transmission of Control PHY messages.

FIGS. 7A-7B depict message bit structures for SSW feedback fields.

FIG. 9 depicts a message bit structure for 802.11ay PPDU messages.

FIGS. 12A-12E depict various 802.11ay configurations.

FIG. 18 depicts a message bit structure for optional feedback format for effective channel after beamforming.

FIG. 20 depicts a message bit structure for exemplary enhanced SSW feedback fields for multi-stage eSLS.

FIG. 24 illustrates Beamforming Capability Frame Format carried as part of the MIMO Setup frame (separate signaling).

FIG. 25 illustrates Beamforming Capability Frame Format carried as part of the MIMO Setup frame (single bit signaling).

FIGS. 26A-26C illustrate examples of training packets/frames.

FIG. 29 illustrates a Beamforming Capability Frame Format carried as part of the MIMO Setup frame (separate signaling).

FIG. 30 illustrates a Beamforming Capability Frame Format carried as part of the MIMO Setup frame (single bit signaling).

FIG. 31 illustrates a MU-MIMO selection frame according to some embodiments.

FIG. 32 illustrates a Separate Frame with CEF/TRN fields according to some embodiments.

FIG. 33 illustrates a MU-MIMO Selection Frame with parameters and CEF/TRN.

FIG. 34 illustrates a method according to an exemplary embodiment.

FIG. 35 illustrates a further method according to another exemplary embodiment.

FIG. 39 illustrates one embodiment of the Beamforming Capability field format.

DETAILED DESCRIPTION

Overview of WLAN

Figure 1A:
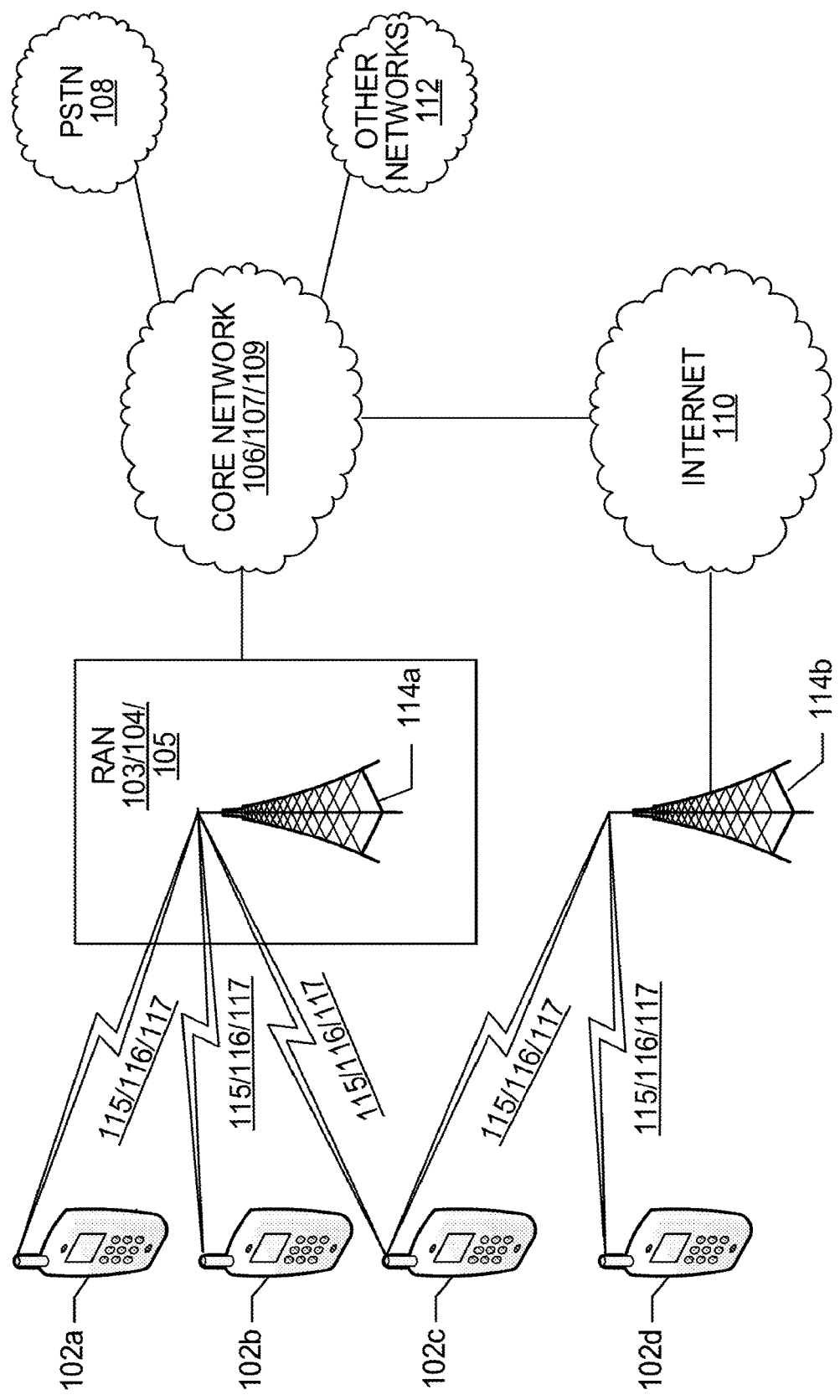
FIG. 1A depicts an example communications system in which one or more disclosed embodiments may be implemented.

A WLAN in Infrastructure Basic Service Set (BSS) mode has an Access Point (AP/PCP) for a BSS and one or more stations (STAs) associated with the AP/PCP. The AP/PCP typically accesses or interfaces to a Distribution System (DS) or another type of wired or wireless network that carries traffic in and out of the BSS. Traffic to STAs that originates from outside the BSS arrives through the AP/PCP and is delivered to the STAs. Traffic originating from STAs to destinations outside the BSS is sent to the AP/PCP to be delivered to the respective destinations. Traffic between STAs within the BSS may also be sent through the AP/PCP where the source STA sends traffic to the AP/PCP and the AP/PCP delivers the traffic to the destination STA. Such traffic between STAs within a BSS is similar to peer-to-peer traffic. Such peer-to-peer traffic may also be sent directly between source and destination STAs with a direct link setup (DLS) using an 802.11e DLS or an 802.11z tunneled DLS (TDLS). A WLAN using an Independent BSS (IBSS) mode lacks an AP/PCP and/or STAs and communicates directly with each other. This method of communication is an "ad-hoc" mode of communication.

Using an 802.11ac infrastructure mode of operation, an AP/PCP may transmit a beacon on a fixed channel, usually a primary channel. This channel may be 20 MHz wide and may be the operating channel of the BSS. STAs also use this channel to establish a connection with an AP/PCP. A fundamental channel access mechanism in an 802.11 system is Carrier Sense Multiple Access with Collision Avoidance (CSMA/CA) mode. In this mode of operation, every STA, including the AP/PCP, will sense a primary channel. If the primary channel is detected to be busy, the STA backs off. Hence, only one STA may transmit at any given time in a given BSS.

In 802.11n (see IEEE Std 802.11-2012, *Wireless LAN Medium Access Control (MAC) and Physical Layer (PHY) Specifications.*), High Throughput (HT) STAs may also use a 40 MHz wide channel for communication. This throughput is achieved by combining the primary 20 MHz channel, with an adjacent 20 MHz channel to form a 40 MHz wide contiguous channel.

In 802.11ac (see IEEE P802.11ac/D1.0: Part 11, *Wireless LAN Medium Access Control (MAC) and Physical Layer (PHY) specifications. Amendment 5: Enhancements for Very High Throughput for Operation in Bands below 6 GHz.*), Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining eight contiguous, 20 MHz channels, or by combining two non-contiguous, 80 MHz channels, which may be referred to as an 80+80 configuration. For an 80+80 configuration, data, after channel encoding, passes through a segment parser that divides the data into two streams. IFFT and time domain processing are done on each stream separately. The streams are then mapped on to the two channels, and the data is transmitted. At the receiver, this mechanism is reversed, and the combined data is sent to the MAC.

Sub-1 GHz modes of operation are supported by 802.11af (see IEEE 802.11-10/0258r0, *MAC and PHY Proposal for 802.11af*, March 2010.) and 802.11ah (see IEEE 802.11-10/0001r13, *Sub 1 GHz License-Exempt PAR and 5C*, July 2010.). For these specifications, the channel operating bandwidths and carriers are reduced relative to those used in 802.11n and 802.11ac. 802.11af supports 5 MHz, 10 MHz, and 20 MHz bandwidths in the TV White Space (TVWS) spectrum, and 802.11ah supports 1 MHz, 2 MHZ, 4 MHZ, 8 MHz, and 16 MHz bandwidths using non-TVWS spectrum. A possible use case for 802.11ah is supporting Meter Type Control (MTC) devices in a macro coverage area. MTC devices may have limited capabilities, including support for only limited bandwidths, but also must support a very long battery life.

WLAN systems which support multiple channels and channel widths, such as 802.11n, 802.11ac, 802.11af, and 802.11ah, including a channel designated as a primary channel. A primary channel may have a bandwidth equal to the largest common operating bandwidth supported by all STAs in a BSS. The bandwidth of the primary channel is therefore limited by the STA, of all STAs operating in a BSS, which supports the smallest bandwidth operating mode. In the example of 802.11ah, the primary channel may be 1 MHz wide if there are STAs (e.g., MTC-type devices) that only support a 1 MHz mode even if the AP/PCP and other STAs in the BSS, may support a 2 MHz, 4 MHz, 8 MHz, 16 MHz, or other channel bandwidth operating modes. All carrier sensing, and NAV settings, depend on the status of the primary channel. If the primary channel is busy, for example due to a STA supporting only a 1 MHz operating mode for transmitting to the AP/PCP, then all available frequency bands are considered busy, even though majority of frequency bands stay idle and available.

In the United States, available frequency bands for 802.11ah are from 902 MHz to 928 MHz. In Korea, available frequencies are from 917.5 MHz to 923.5 MHz. In Japan, available frequencies are from 916.5 MHz to 927.5 MHz. The total bandwidth available for 802.11ah is 6 MHz to 26 MHz depending on the country code.

To improve spectral efficiency, 802.11ac introduced downlink Multi-User MIMO (MU-MIMO) transmissions to multiple STA's in the same symbol's time frame, e.g., during a downlink OFDM symbol. The potential for the use of downlink MU-MIMO is also currently considered for 802.11ah. Because downlink MU-MIMO (as used in 802.11ac) uses the same symbol timing to multiple STAs, interference of the waveform transmissions to multiple STAs is not an issue. However, all STAs involved in MU-MIMO transmission with the AP/PCP must use the same channel or band. This stipulation limits the operating bandwidth to the smallest channel bandwidth that is supported by the STAs that are included in an MU-MIMO transmission with a AP/PCP.

802.11ad 802.11ad (see IEEE Std 802.11ad-2012, Part 11: *Wireless LAN Medium Access Control (MAC) and Physical Layer (PHY) Specifications Amendment 3: Enhancements for Very High Throughput in the 60 GHz Band*; and Agilent Technologies, *Wireless LAN and 60 GHz IEEE* 802.11*ad Explained*.) is an amendment to the WLAN standard, which specifies the MAC and PHY layers for very high throughput (VHT) in the 60 GHz band. 802.11ad supports four features: data rates up to 7 Gbits/s, three modulation modes, 60 GHz frequency band, and frame structure support for beamform training. The three modulation modes supported are: Control PHY with single carrier and spread spectrum, Single Carrier PHY, and OFDM PHY. The 60 GHz band is unlicensed and available globally. At 60 GHz, the wavelength is 5 mm, which makes compact and antenna or antenna arrays possible. Narrow RF beams may be created for both transmission and reception using such an antenna, which effectively increases coverage range and reduces interference.

The frame structure of 802.11ad facilitates a mechanism for beamforming training (discovery and tracking). The beamforming training protocol comprises two procedures: a sector-level sweep (SLS) and a beam refinement protocol (BRP). The SLS procedure is used for transmit beamforming training: the BRP procedure enables receive beamforming training and iterative refinement of both transmit and receive beams. MIMO transmissions, including both SU-MIMO and MU-MIMO, are not supported by 802.11ad.

802.11ad PPDU Formats 802.11ad supports three PPDU formats, which are Control PHY, Single Carrier (SC) PHY, and OFDM PHY PPDUs. FIG. 2 shows all three PPDU formats.

802.11ad Control PHY

Control PHY is defined in 802.11ad as the lowest data rate transmission. Frames that have to be transmitted before beamforming training may use Control PHY PPDU. FIG. 3 shows a block diagram for transmission of Control PHY.

Sector Level Sweep

Figure 4:
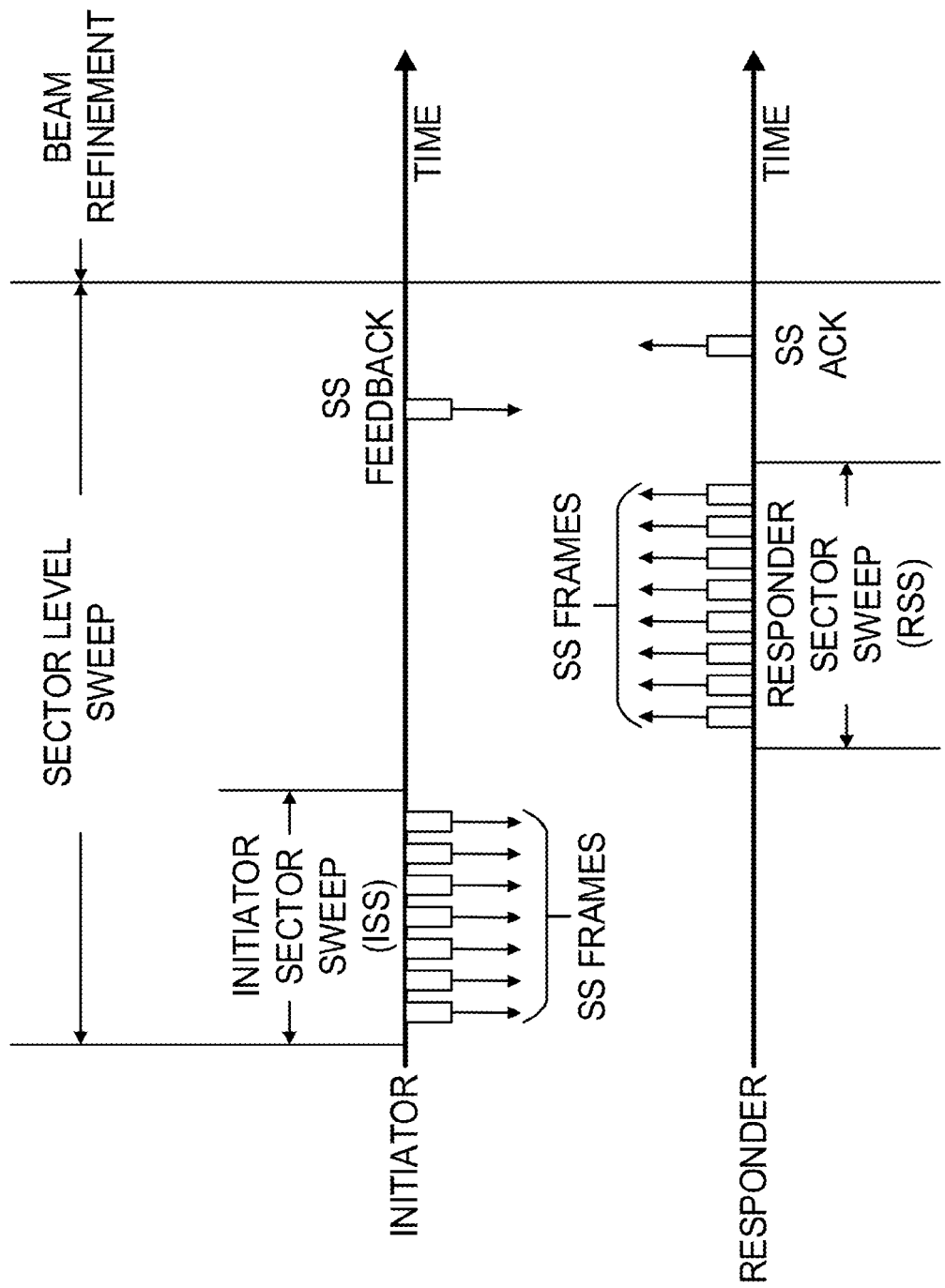
FIG. 4 depicts a block diagram for transmission of Sector Level Sweep messages.
Figure 5:
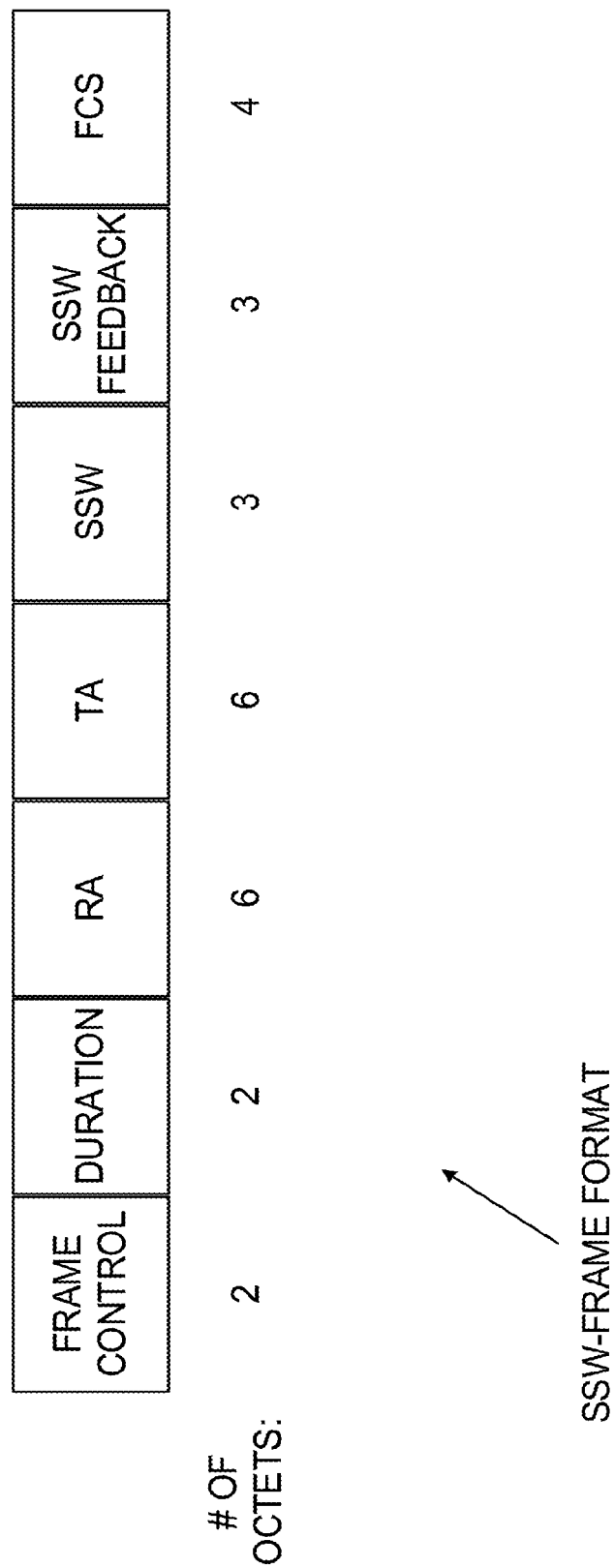
FIG. 5 depicts a message octet structure for SSW frames.
Figure 6:
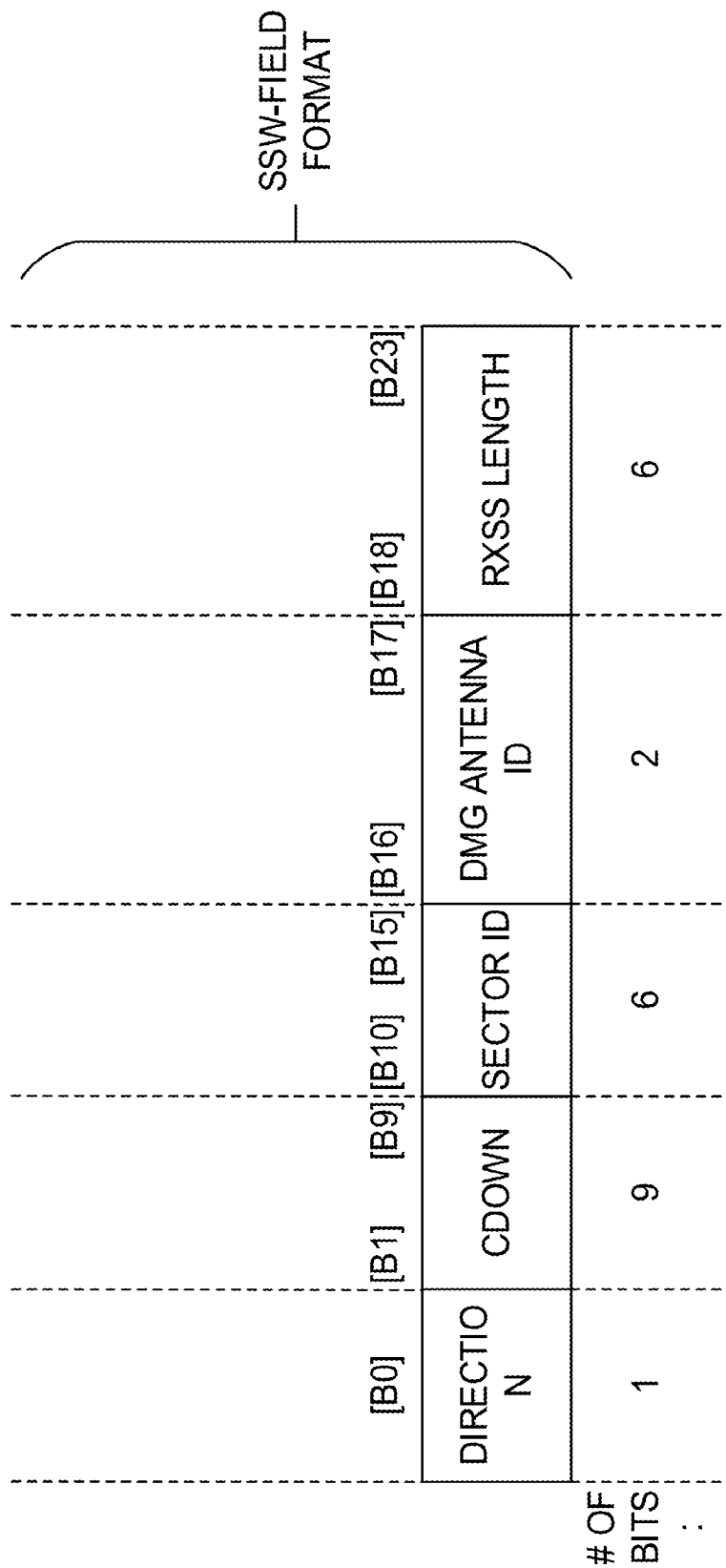
FIG. 6 depicts a message bit structure for SSW fields.

FIG. 4 shows an exemplary Sector Level Sweep (SLS) training procedure. SLS training may be performed using a Beacon frame or an SSW frame. When a Beacon frame is utilized, an AP repeats a Beacon frame with multiple beams/sectors within each Beacon Interval (BI), and multiple STAs may perform BF training simultaneously. However, due to the size of a Beacon frame, an AP may not sweep all sectors/beams within one BI. A STA may wait multiple BIs to complete ISS training, and latency may be an issue. A SSW frame may be utilized for point to point BF training. A SSW frame may be transmitted using control PHY. FIG. 5 shows the frame format for a SSW frame, while FIG. 6 shows the SSW field format. FIG. 7A shows the SSW Feedback Field Format as transmitted as part of an ISS and FIG. 7B shows it as not part of an ISS.

Beam Refinement Protocol (BRP)

Beam refinement is a process where a STA can improve its antenna configuration (or antenna weight vectors) for transmission and reception. In a beam refinement procedure, BRP packets are used to train a receiver and transmitter antenna. There are two types of BRP packets: BRP-RX packets and BRP-TX packets. BRP packet may be carried by a DMG PPDU followed by a training field containing an AGC field and a transmitter or receiver training field, as shown in FIG. 8.

Figure 8:
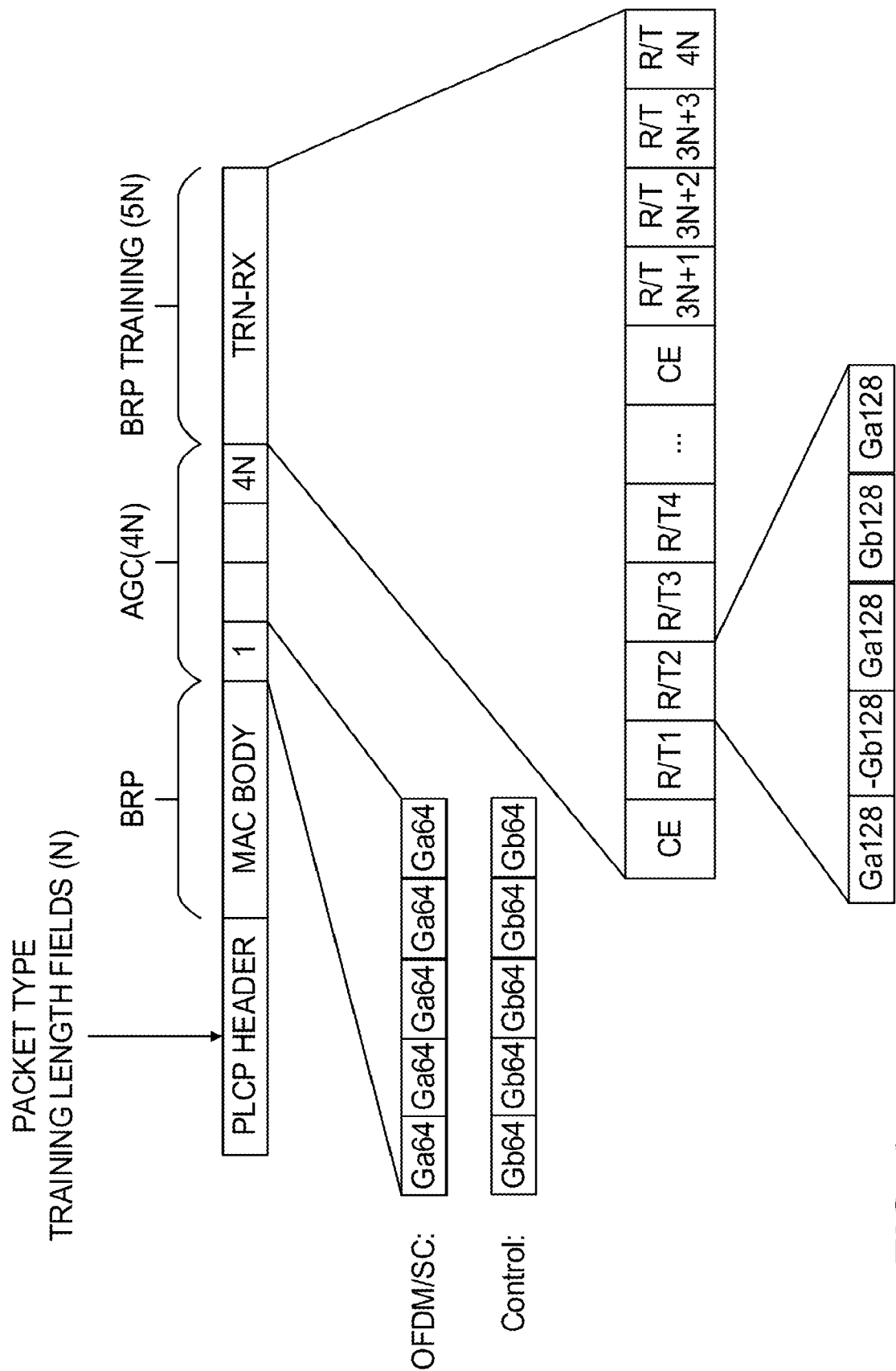
FIG. 8 depicts a message packet structure for BRP TRN-RX packets.

In FIG. 8, the variable N holds the Training Length given in the header filed, which indicates that the AGC has 4N subfields and that the TRN-R/T field has 5N subfields. All subfields in the beam training field are transmitted using a rotated $\pi/2$-BPSK modulation. A BRP MAC frame is an Action No ACK frame with the following fields: Category, Unprotected DMG Action, Dialog Token, BRP Request Field, DMG Beam Refinement Element, and Channel Measurement Feedback Elements 1 to k.

802.11ay (TGay)

Requirements of 802.11ay

Task Group ay (TGay), approved by IEEE in March 2015, is expected to develop an amendment that defines standardized modifications to both the IEEE 802.11 physical layers (PHY) and the IEEE 802.11 medium access control layer (MAC). The amendment is expected to enable at least one mode of operation capable of supporting a maximum throughput of at least 20 gigabits per second (measured at a MAC data service access point), while maintaining or improving power efficiency per station. This amendment also defines operations for license-exempt bands above 45 GHz while ensuring backward compatibility and coexistence with legacy directional multi-gigabit stations (defined by the IEEE 802.11ad-2012 amendment) operating in the same band.

Although the primary goal of TGay is much higher maximum throughput than 802.11ad, some members of the group also proposed to include mobility and outdoor support. More than ten different use cases are proposed and analyzed in terms of throughput, latency, operation environment, and applications (see Huawei, et. al., IEEE 802.11-2015/062512, IEEE 802.11 TGay Use Cases.). Because 802.11ay will operate in the same band as legacy standards, the new standard will have backward compatibility and coexistence with legacies in the same band.

802.11ay PPDU Format

Format for an 802.11ay PPDU contains legacy elements and new EDMG elements. FIG. 9 shows the detailed PPDU format. The L-STF, L-CEF, L-Header and EDMG-Header-A fields are transmitted using SC mode for backward compatibility. The January 2016 IEEE meeting agreed that for a control mode PPDU, the reserved bits 22 and 23 may be set to 1 to indicate the presence of an EDMG-Header-A field. For an SC-mode PPDU or OFDM-mode PPDU, previously reserved bit 46 may be set to 1 to indicate the presence of the EDMG-Header-A field.

Multi-Antenna Analog Beamforming Methods for 802.11ad

Figure 10:
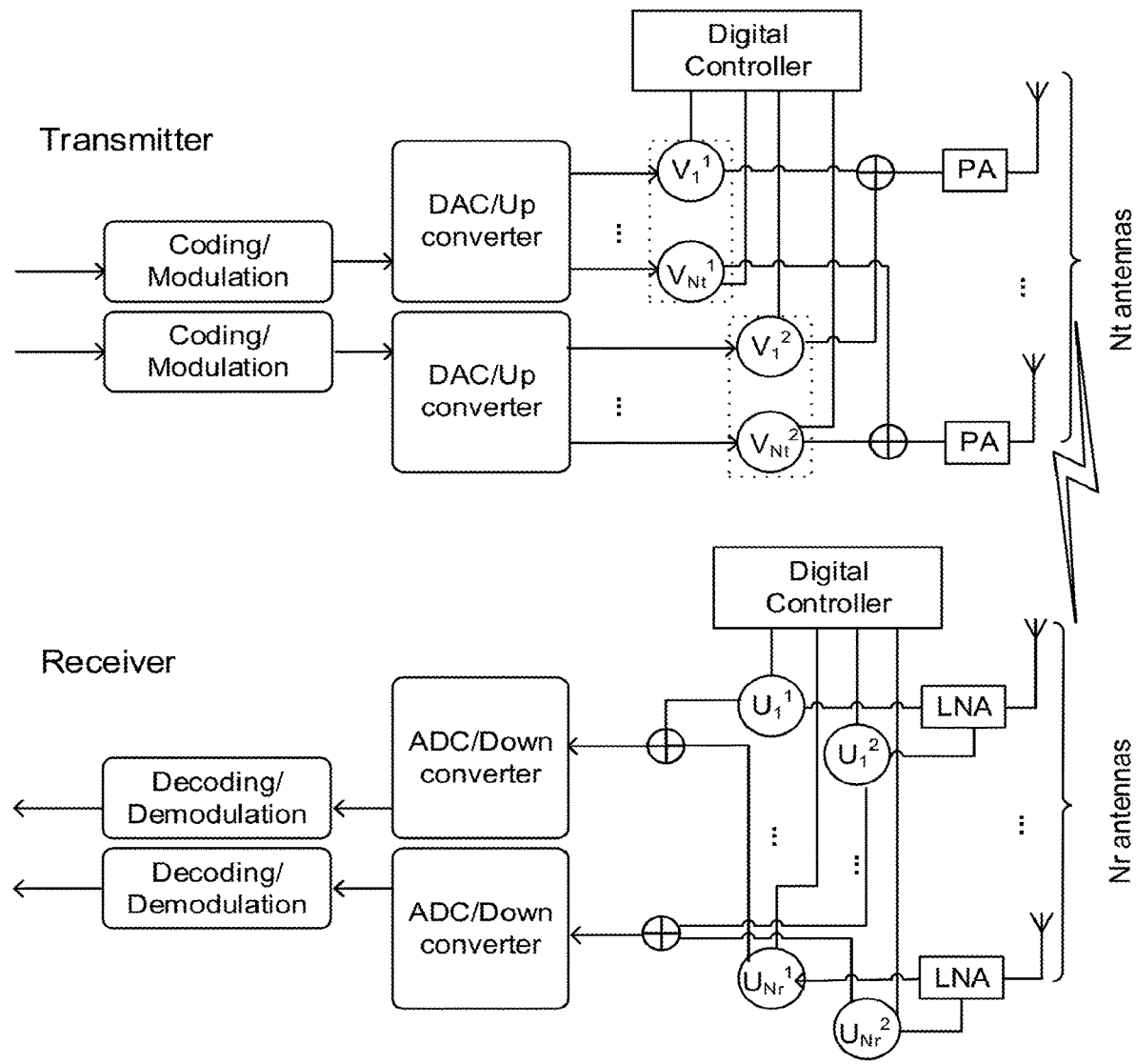
FIG. 10 depicts a block diagram of a multi-antenna analog beamforming method with all PAs excited by all weights.
Figure 11:
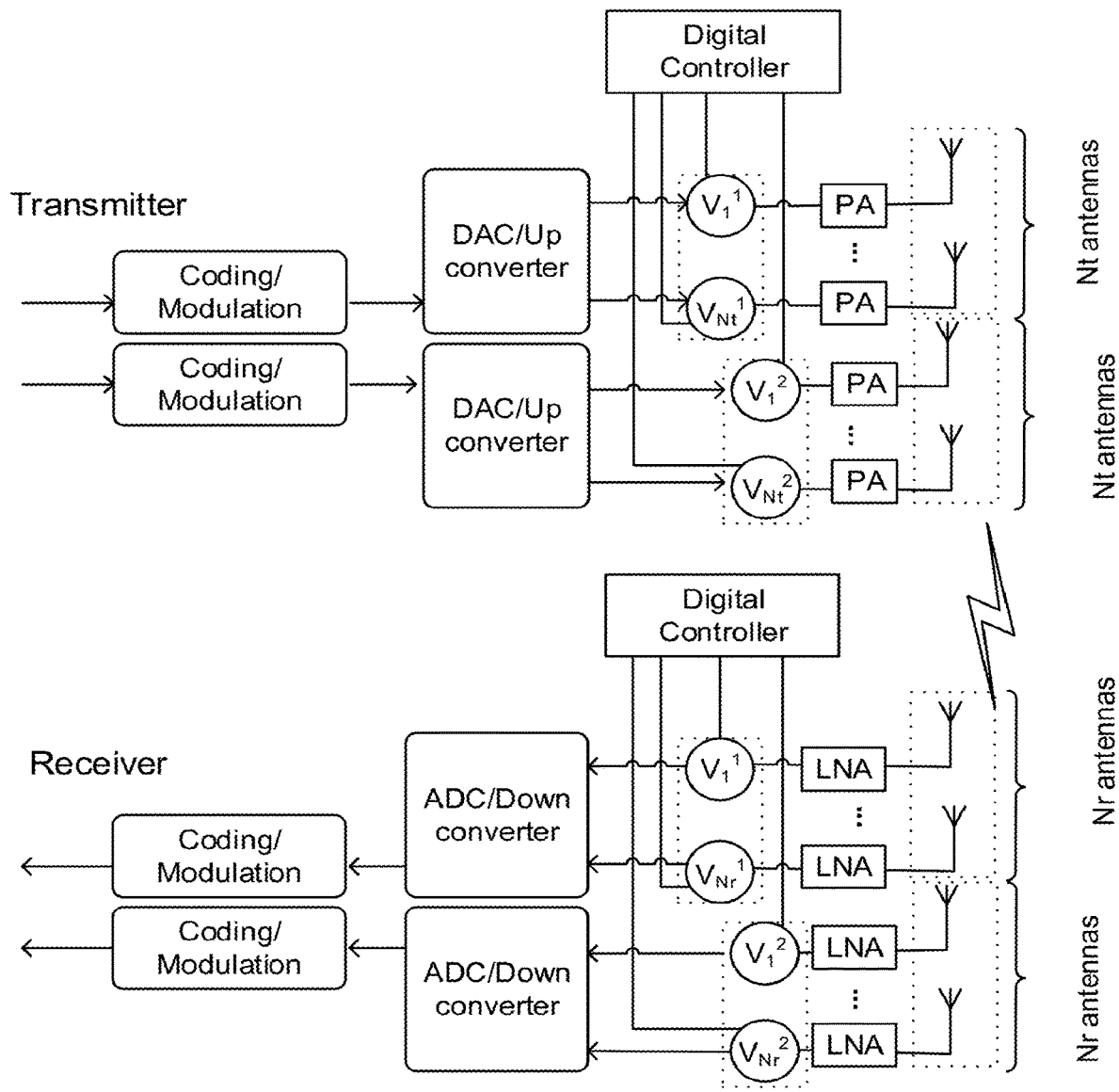
FIG. 11 depicts a block diagram of a multi-antenna analog beamforming method with different PAs excited by separate weights.
Figure 12A:
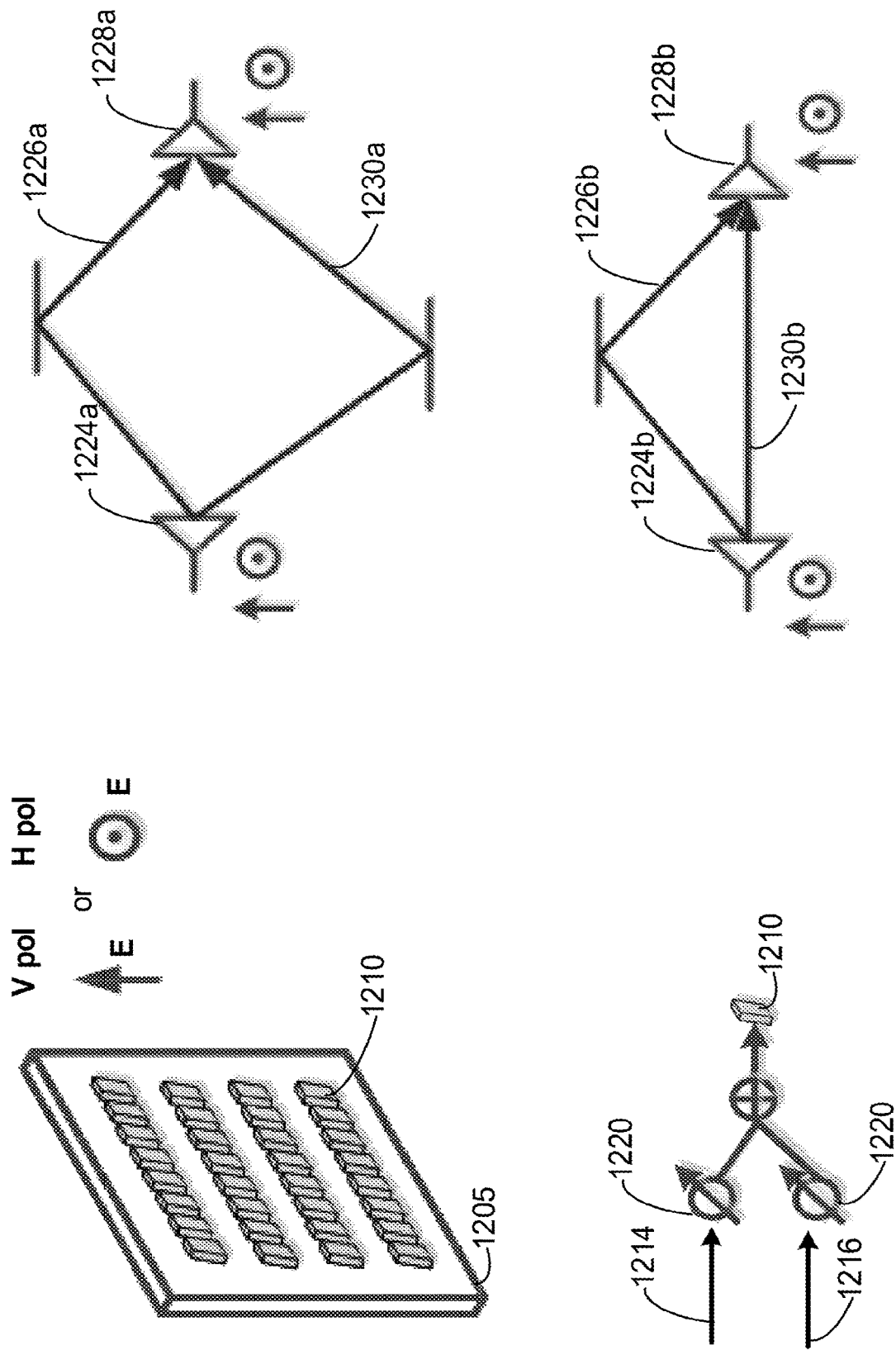
Figure 12B:
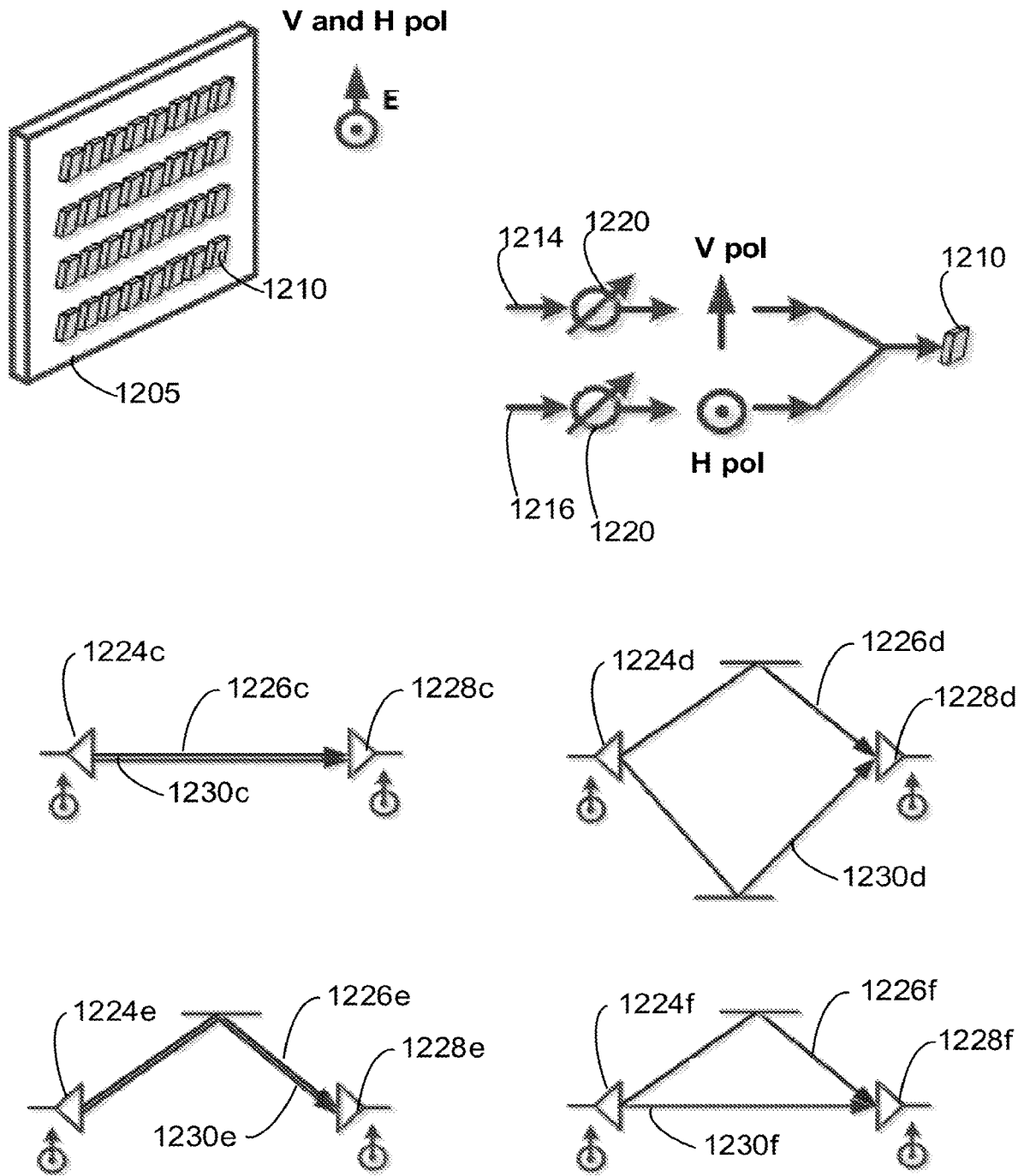
Figure 12D:
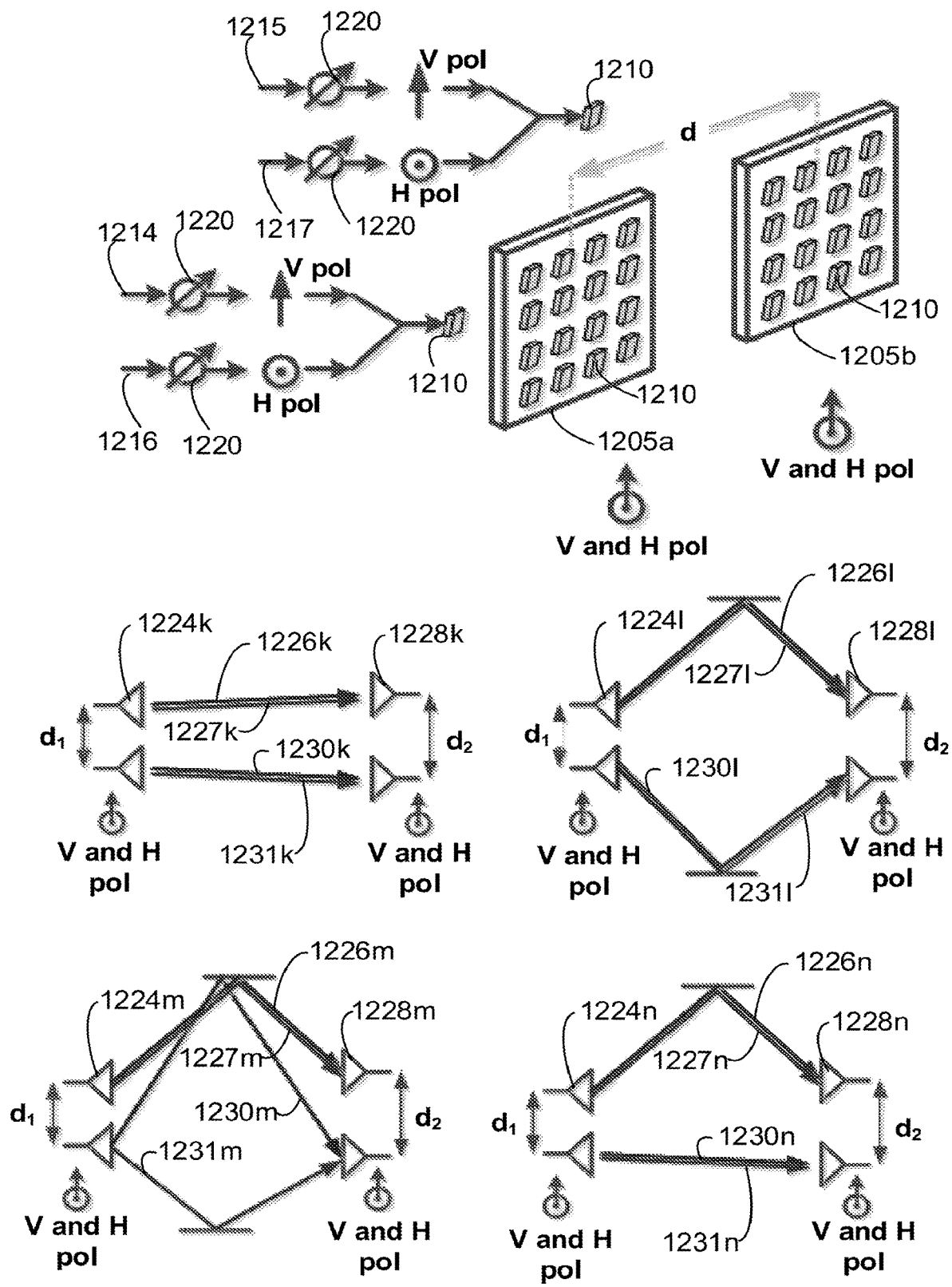
Figure 12E:
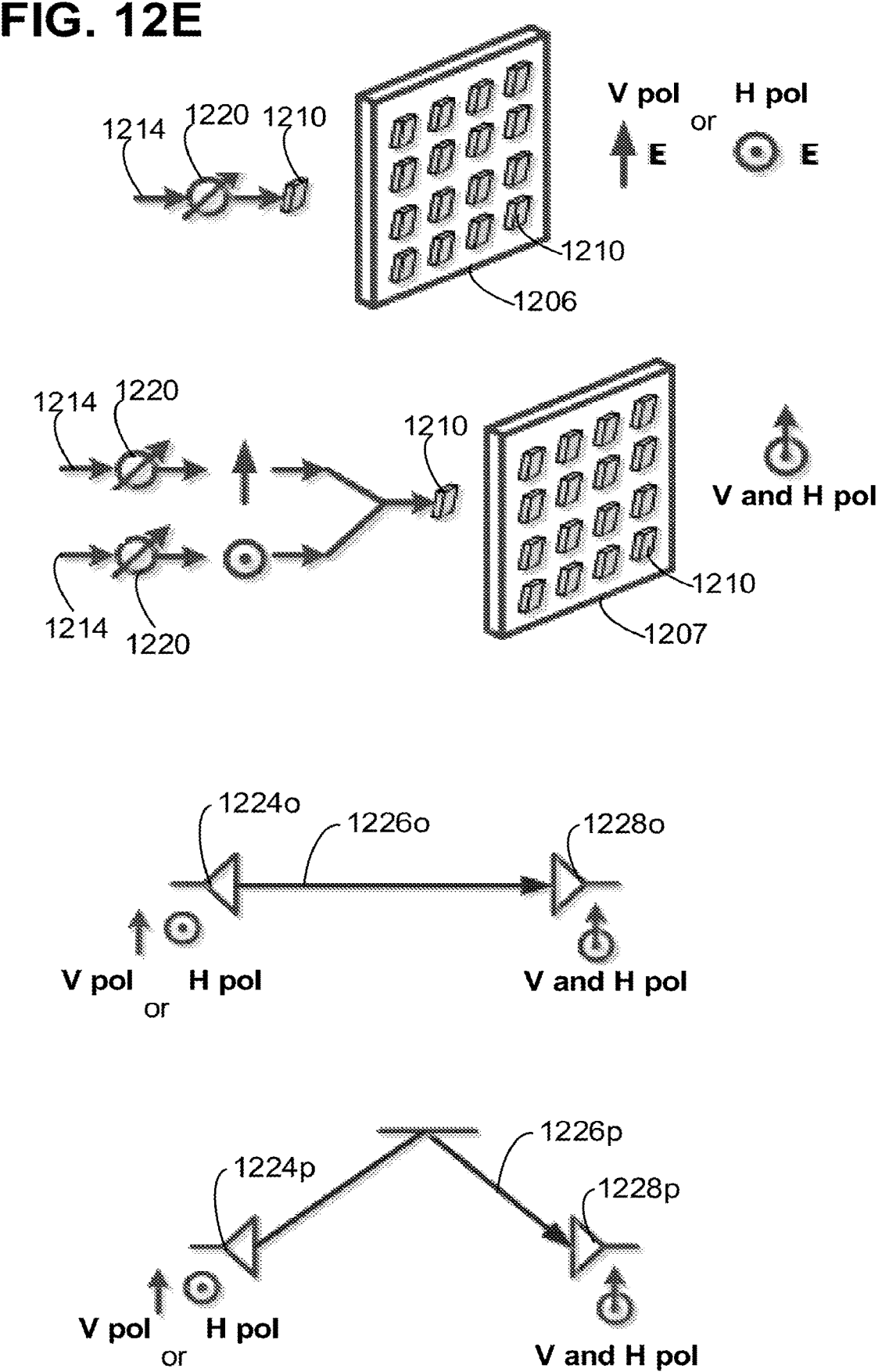

Based on issues with analog beamforming found using the IEEE 802.11ad protocol, analog beamforming methods for 802.11ad+/802.11ay have been proposed. Proposals relate to: spatial diversity with beam switching, spatial diversity with a single beam, weighted multipath beamforming training, beam division multiple access, single user spatial multiplexing, and reduced beamforming training overhead. Two architectures are proposed: one with all physical antennas (PA) excited by all the weights (shown in FIG. 10), while the second architecture has different PAs excited by separate weights (shown in FIG. 11).

Overview of Next Generation Cellular (5G) Systems

In next generation mobile communications (or 5G networks), applications such as enhanced mobile broadband (eMBB), massive Machine Type Communications (mMTC), and Ultra-Reliable Low Latency Communications (URLLC) have been proposed (see 3GPP TR 38.913 v0.3 (Release 2014), *Study on Scenarios and Requirements for Next Generation Access Technologies*, March 2016.) A wide range of spectrum bands ranging from 700 MHz to 80 GHz are under consideration for a variety of deployment scenarios. These scenarios include both licensed and unlicensed spectrum.

A long list of technologies are currently under study for a new air interface to enable the operation of these different applications in the deployment scenarios. These include new waveforms, modulation and coding techniques, multiple access techniques, multiple antenna techniques, interference management techniques and duplexing methods. In addition, new network architectures are being considered to minimize the presence of "always-on" signals and to adapt to the beamforming needed especially at higher frequencies.

Multiple Antennas for Cellular Systems

For sub-6 GHz transmission, multiple antenna techniques, such as Multiple Input Multiple Output (MIMO) transmission and related versions, e.g., Single Input Multiple Output (SIMO) and Multiple Input Single Output (MISO), have contributed significantly to the advancement of telecommunications. Different MIMO techniques deliver different benefits such as providing diversity gain, multiplexing gain, beamforming, and array gain. In the cellular communication paradigm, where UEs communicate to a single central node, use of MU-MIMO may increase system throughput by facilitating the transmission of multiple data streams to different UEs while using the same and/or overlapping sets of resources in time and/or frequency. For the SU-MIMO case, a central node may transmit multiple data streams to the same UE rather than multiple UEs as done for MU-MIMO.

Multiple antenna transmission at millimeter wave frequencies differ slightly from sub-6 GHz multiple antenna techniques. This difference is due to different propagation characteristics at millimeter wave frequencies and a possibility of a BTS/UE having a limited number of RF chains compared with antenna elements.

Millimeter Wave Precoding for Next Generation Wireless Networks (WLAN and Cellular Systems)

Precoding at millimeter wave frequencies may be digital, analog or a hybrid of digital and analog.

Digital Precoding: Digital precoding is precise and may be combined with equalization. It enables single user (SU), multi-user (MU) and multi-cell precoding and is typically used in sub 6 GHz, for example in IEEE 802.11n and beyond and in 3GPP LTE Release 8 and beyond. However, with millimeter wave frequencies, presence of a limited number of RF chains compared to antenna elements and the sparse nature of the channel complicates the use of digital beamforming.

Analog Beamforming: Analog beamforming overcomes a limited number of RF chains issued by using analog phase shifters on each antenna element. It is used in IEEE 802.11ad during sector level sweep (which identifies the best sector), beam refinement (which refines the sector to an antenna beam), and beam tracking (which adjusts the sub-beams over time to take into account any change in the channel) procedures. IEEE 802.15.3 also uses analog beamforming. In this case, the protocol uses a binary search beam training algorithm with a layered multi-resolution beamforming codebook. Analog beamforming is typically limited to single stream transmissions.

Hybrid Beamforming: In hybrid beamforming, a precoder is divided between analog and digital domains. Each domain has precoding and combining matrices with different structural constraints, e.g., a constant modulus constraint for combining matrices in the analog domain. This design results in a compromise between hardware complexity and system performance. Hybrid beamforming may achieve digital precoding performance due to the sparse nature of channels and support for multi-user/multi-stream multiplexing. Even if hybrid beamforming is limited by number of RF chains, this limit may not be an issue because mm Wave channels are sparse in the angular domain.

Dimensionality and 802.11ay Configurations 802.11ad allows for the transmission of a single space time stream. To allow for multiple space time stream transmissions, additional dimensions are needed. Each dimension may support a transmit-receive beam pair. The dimensions include PAA/eDMG antennas, time/tap delay and polarization. Each beam, PAA, eDMG antenna array or channel measurement feeds back N complex time or tap delays. To enable proper feedback in 802.11ay, it is important to capture the additional dimensionality obtained by the allowance of multiple stream transmission (either through the use of channel components arriving at the same PAA from different directions, channel components arriving on different polarizations or channel components arriving at different PAAs/eDMG antennas). Additional feedback may be needed to capture the use of antenna polarization and/or the use of multiple PAAs simultaneously during a transmission.

To illustrate the additional dimensions, configurations that have been discussed in 802.11ay and define the dimensions needed for each configuration are depicted in FIGS. 12A-12E, and are described herein below.

Configuration 1 (FIG. 12A): In this configuration, each element 1210 of the phased antenna array 1205 has a single polarization (either Vertical or Horizontal). Devices at each end have the same configuration. Multiple stream transmission is created by directing beams to channel components that arrive from different directions (and arrive at different tap delays). For example, first stream 1214 and second stream 1216 may be directed through phase shifters 1220 and superimposed prior to being directed to a given PAA element 1210. Examples of beamformed links are also shown. In one example, a first device 1224a transmits beams 1226a and 1230a to a second device 1228a. In one example, a first device 1224*b* transmits beams 1226*b* and 1230*b* to a second device 1228*b*. In this configuration, the dimensionality is

- 1×1 per time dimension, per PAA
- Overall: 1×1 per time dimension

Configuration 2 (FIG. 12B): In this configuration, each element 1210 of the phased antenna array 1205 has dual polarization (both vertical and horizontal). Devices at each end have the same configuration. Multiple stream transmission is created by directing beams to channel components that arrive from different directions (and arrive at different tap delays) and arrive on different polarizations. For example, first stream 1214 and second stream 1216 may be directed through phase shifters 1220, then first stream 1214 directed through a vertical polarizer and second stream 1216 directed through a horizontal polarizer, and then the streams may be superimposed prior to being directed to a given PAA element 1210. Examples of beamformed links are also shown. In one example, a first device 1224*c* transmits beams 1226*c* (horizontal polarization) and 1230*c* (vertical polarization) to a second device 1228*c*. In one example, a first device 1224*d* transmits beams 1226*d* (horizontal polarization) and 1230*d* (vertical polarization) to a second device 1228*d*. In one example, a first device 1224*e* transmits beams 1226*e* (horizontal polarization) and 1230*e* (vertical polarization) to a second device 1228*c*. In one example, a first device 1224*f* transmits beams 1226*f* (horizontal polarization) and 1230*f* (vertical polarization) to a second device 1228*f*. In this configuration, the dimensionality is

- ×2 per time dimension, per PAA
- Overall: 2×2 per time dimension

Configuration 3 (FIG. 12C): In this configuration, each element 1210 of a given PAA 1205 has either vertical or horizontal polarization, with multiple PAAs 1205. The distance between the centers of the PAAs 1205*a* and 1205*b* may be d. Devices at each end have the same configuration. Multiple stream transmission is created by directing beams between PAAs 1205. The channel components on each PAA 1205 may arrive from different directions (and arrive at different tap delays). For example, first stream 1214 may be directed through a phase shifter 1220, then directed to a given PAA element 1210 in a first PAA 1205*a*, and second stream 1216 may be directed through a phase shifter 1220, then directed to a given PAA element 1210 in a second PAA 1205*b*. Examples of beamformed links are also shown. In one example, a first device 1224*g* (having two PAAs with distance $d_1$ between their centers) transmits beams 1226*g* and 1230*g* to a second device 1228*g* (having two PAAs with distance $d_2$ between their centers). In one example, a first device 1224*h* (having two PAAs with distance $d_1$ between their centers) transmits beams 1226*h* and 1230*h* to a second device 1228*h* (having two PAAs with distance $d_2$ between their centers). In one example, a first device 1224*i* (having two PAAs with distance $d_1$ between their centers) transmits beams 1226*i* and 1230*i* to a second device 1228*i* (having two PAAs with distance $d_2$ between their centers). In one example, a first device 1224*j* (having two PAAs with distance $d_1$ between their centers) transmits beams 1226*j* and 1230*j* to a second device 1228*j* (having two PAAs with distance $d_2$ between their centers). In this configuration, the dimensionality is

- 1×1 per time dimension, per PAA
- Overall: 2×2 per time dimension

Configuration 4 (FIG. 12D): In this configuration, each element 1210 has dual polarization (vertical and horizontal) with multiple PAAs 1205. The distance between centers of the PAAs 1205*a* and 1205*b* may be d. Devices at each end have the same configuration. Multiple stream transmission is created by directing beams to channel components that arrive from different directions (and arrive at different tap delays) and arrive on different polarizations from the different PAAs. For example, first stream 1214 may be directed through a phase shifter 1220, pass through a vertical polarizer, while a second stream 1216 may be directed through a phase shifter 1220 and then pass through a horizontal polarizer, then the two streams 1214 and 1216 may be superimposed and then directed to a given PAA element 1210 in a first PAA 1205*a*; also a third stream 1215 may be directed through a phase shifter 1220, pass through a vertical polarizer, while a fourth stream 1217 may be directed through a phase shifter 1220 and then pass through a horizontal polarizer, then the two streams 1215 and 1217 may be superimposed and then directed to a given PAA element 1210 in a second PAA 1205*b*. Examples of beamformed links are also shown. In one example, a first device 1224*k* (having two PAAs with distance $d_1$ between their centers) transmits beams 1226*k* (horizontal) and 1227*k* (vertical) to a second device 1228*k* (having two PAAs with distance d: between their centers), as well as beams 1230*k* (horizontal) and 1231*k* (vertical). In one example, a first device 1224*l* (having two PAAs with distance $d_1$ between their centers) transmits beams 1226*l* (horizontal) and 1227*l* (vertical) to a second device 1228*l* (having two PAAs with distance $d_2$ between their centers), as well as beams 1230*l* (horizontal) and 1231*l* (vertical). In one example, a first device 1224*m* (having two PAAs with distance $d_1$ between their centers) transmits beams 1226*m* (horizontal) and 1227*m* (vertical) to a second device 1228*m* (having two PAAs with distance do between their centers), as well as beams 1230*m* (horizontal) and 1231*m* (vertical). In one example, a first device 1224*n* (having two PAAs with distance $d_1$ between their centers) transmits beams 1226*n* (horizontal) and 1227*n* (vertical) to a second device 1228*n* (having two PAAs with distance $d_2$ between their centers), as well as beams 1230*n* (horizontal) and 1231*n* (vertical). In this configuration, the dimensionality is

- ×2 per time dimension, per PAA
- Overall: 4×4 per time dimension

Configuration 5 (FIG. 12E): In this configuration, each element 1210 at the transmitter 1206 has either vertical or horizontal polarization, while each element 1210 at the receiver 1207 is dual polarized (i.e., horizontal and vertical polarization). In this case, the transmission is single stream with multi-dimension reception at the reception. For example, at a transmitter 1206, a first signal stream 1214 is directed through a phase shifter 1220 and then to an element 1210. The beam is transmitted from the transmitter 1206 to the receiver 1207. At the receiver 1207, dual polarization may be used to pass the single stream 1214 through phase shifters 1220 and a vertical polarizer or a horizontal polarizer, then the separate streams 1214 may be superimposed and passed to an element 1210 of the receiver 1207. Examples of beamformed links are also shown. In one example, a first device 1224*o* (e.g., transmitter) transmits single polarized beam 1226*o* (e.g., either vertical or horizontal polarization) to a second device 1228*o* (e.g., receiver), which has dual polarized elements. In one example, a first device 1224*p* (e.g., transmitter) transmits single polarized beam 1226*p* (e.g., either vertical or horizontal polarization) to a second device 1228*p* (e.g., receiver), which has dual polarized elements. In this configuration, the dimensionality is

- 1×2 per time dimension, per PAA (SIMO)
- Overall: 1×2 per time dimension

Network Architecture

The systems and methods described herein may be used with the wireless communication systems described with respect to FIGS. 1A-1F. As an initial matter, these wireless systems will be described. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c. 102d may implement a radio technology such as IEEE 802.11 to establish a wireless local area network (WLAN). In another embodiment, the base station 114b and the WTRUs 102c. 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling. Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c. 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
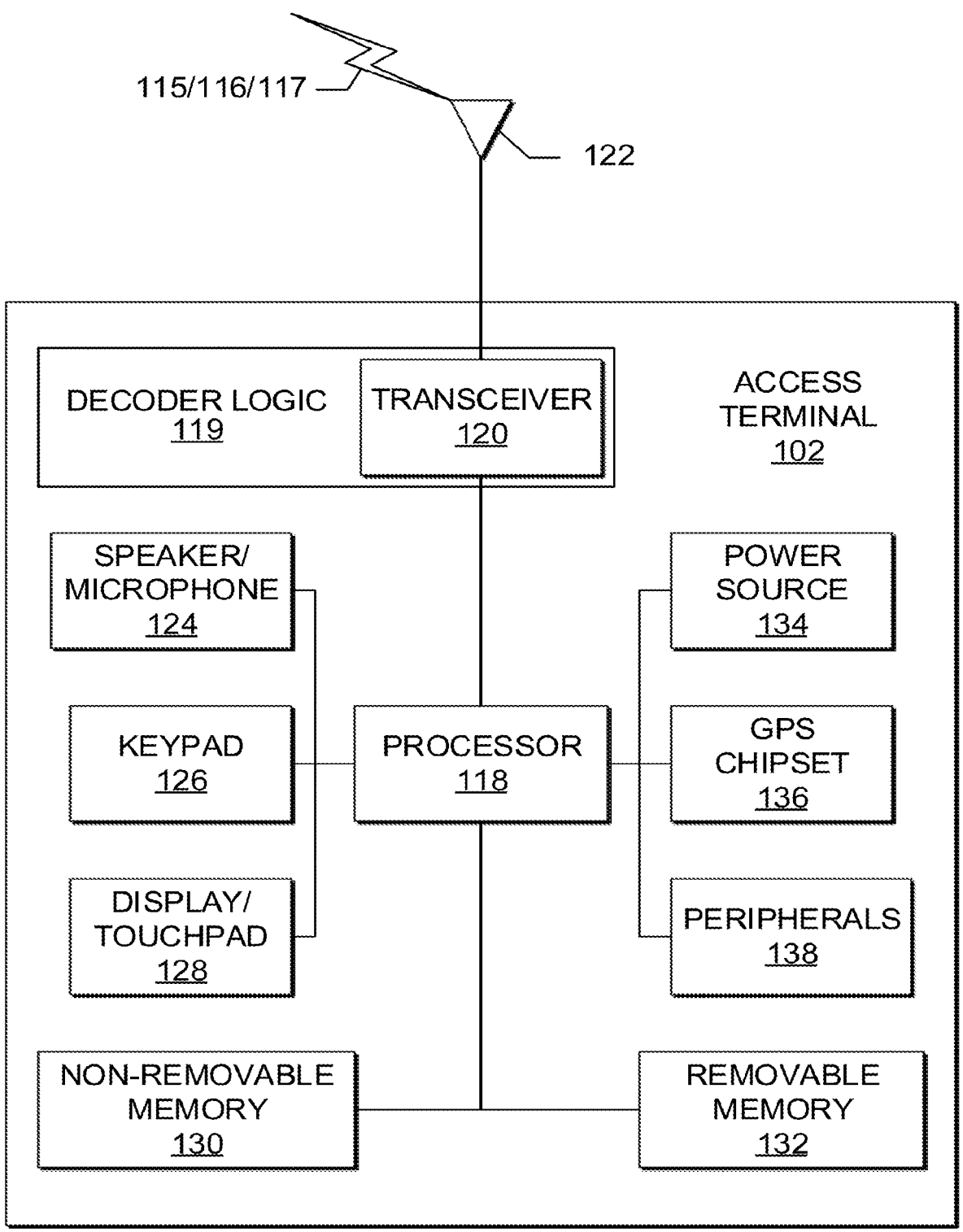
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 can be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
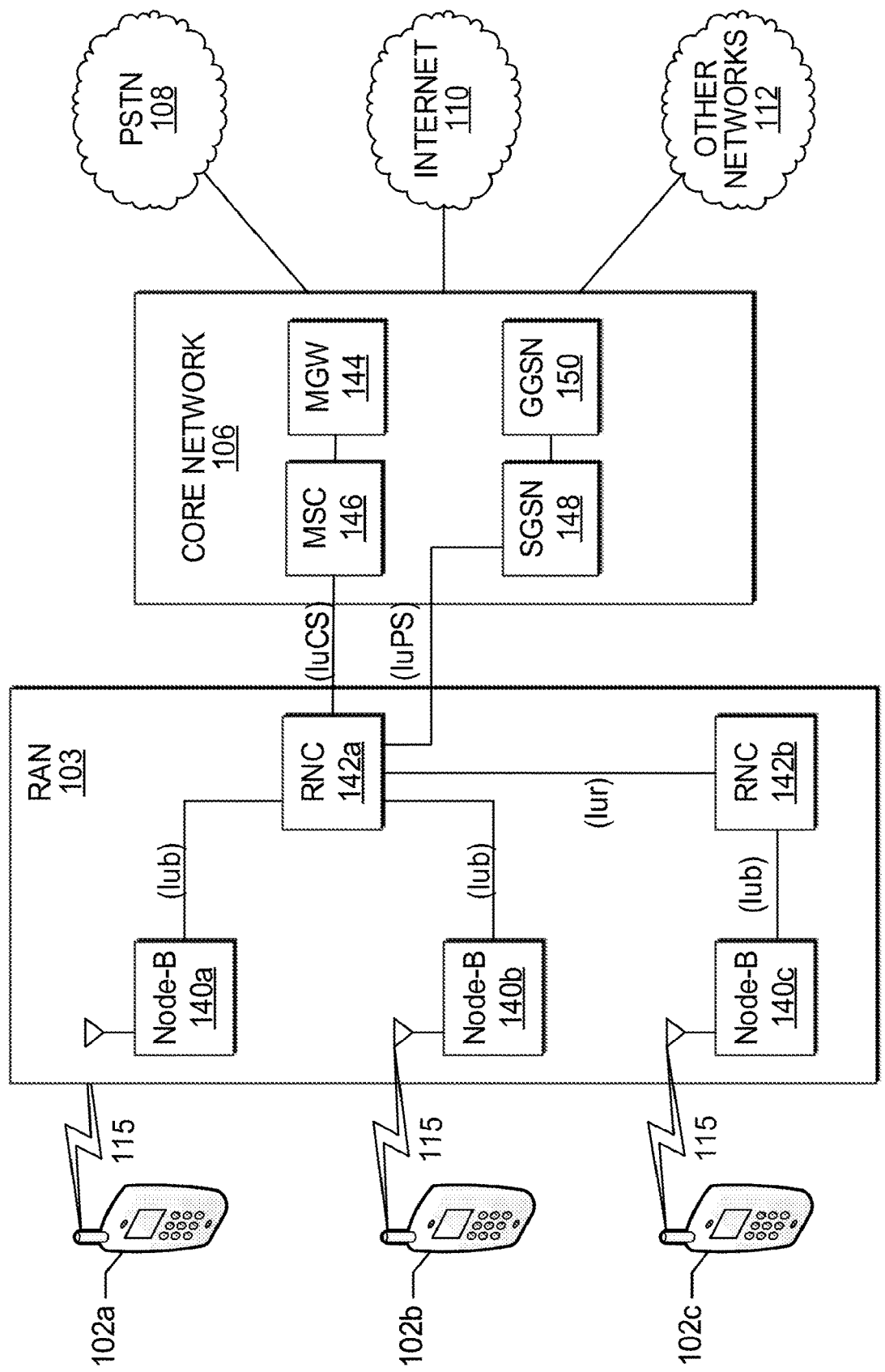
FIG. 1C depicts an example radio access network (RAN) and an example core network that may be used within the communications system of FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNC's while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired and/or wireless networks that are owned and/or operated by other service providers.

Figure 1D:
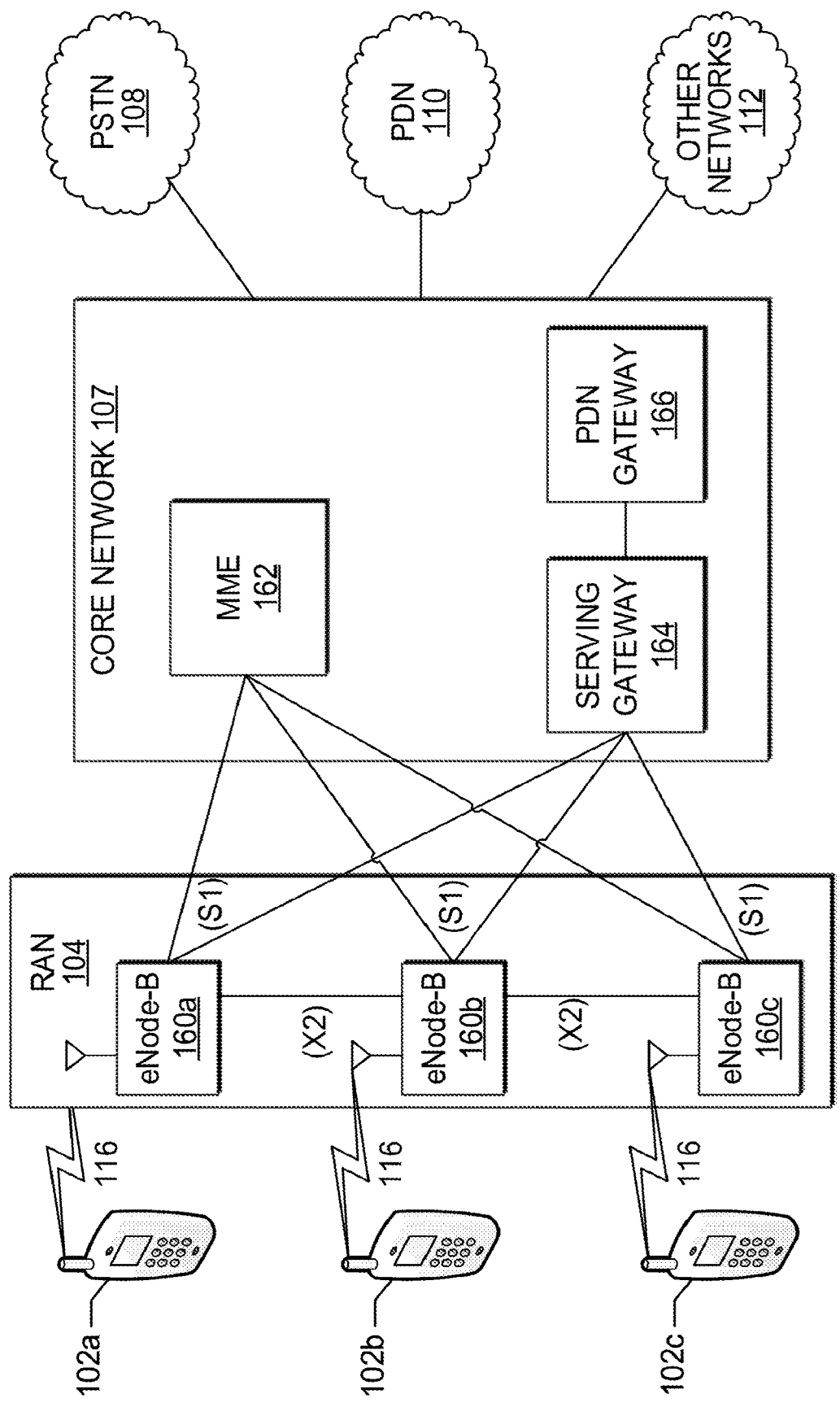
FIG. 1D depicts a second example RAN and a second example core network that may be used within the communications system of FIG. 1A.

FIG. 1D is a system diagram of the RAN 104 and the core network 107 according to an embodiment. As noted above, the RAN 104 may employ an E-UTRA radio technology to communicate with the WTRUs 102a. 102b, 102c over the air interface 116. The RAN 104 may also be in communication with the core network 107.

The RAN 104 may include eNode Bs 160a, 160b, 160c, though it will be appreciated that the RAN 104 may include any number of eNode Bs while remaining consistent with an embodiment. The eNode Bs 160a, 160b. 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio-resource-management decisions, handover decisions, scheduling of users in the uplink and/or downlink, and the like. As shown in FIG. 1D, the eNode Bs 160a, 160b, 160c may communicate with one another over an X2 interface.

The core network 107 shown in FIG. 1D may include a mobility management entity (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 1026, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the SI interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b. 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired and/or wireless networks that are owned and/or operated by other service providers.

Figure 1E:
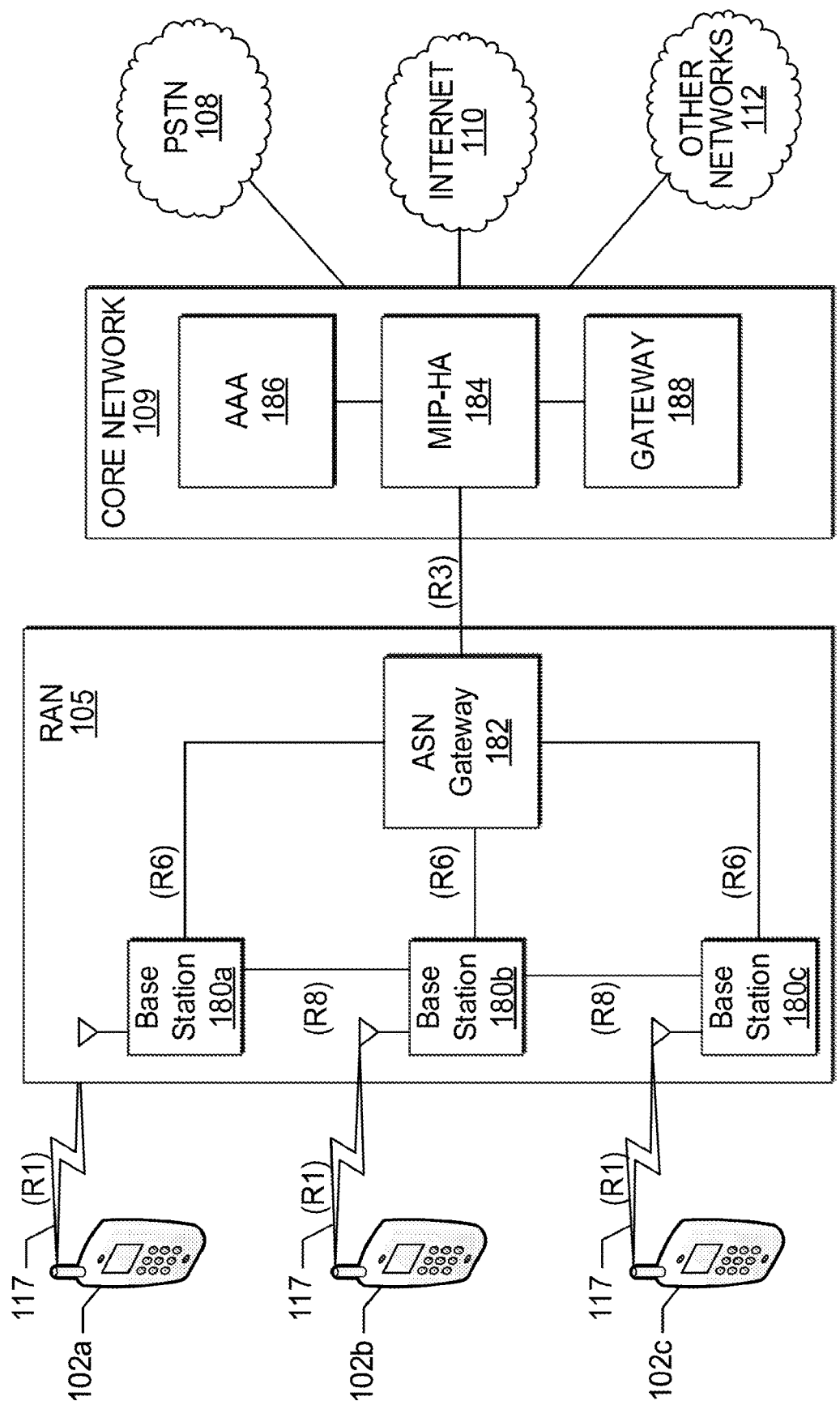
FIG. 1E depicts a third example RAN and a third example core network that may be used within the communications system of FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b. 180c may also provide mobility-management functions, such as handoff triggering, tunnel establishment, radio-resource management, traffic classification, quality-of-service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b. 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 1F:
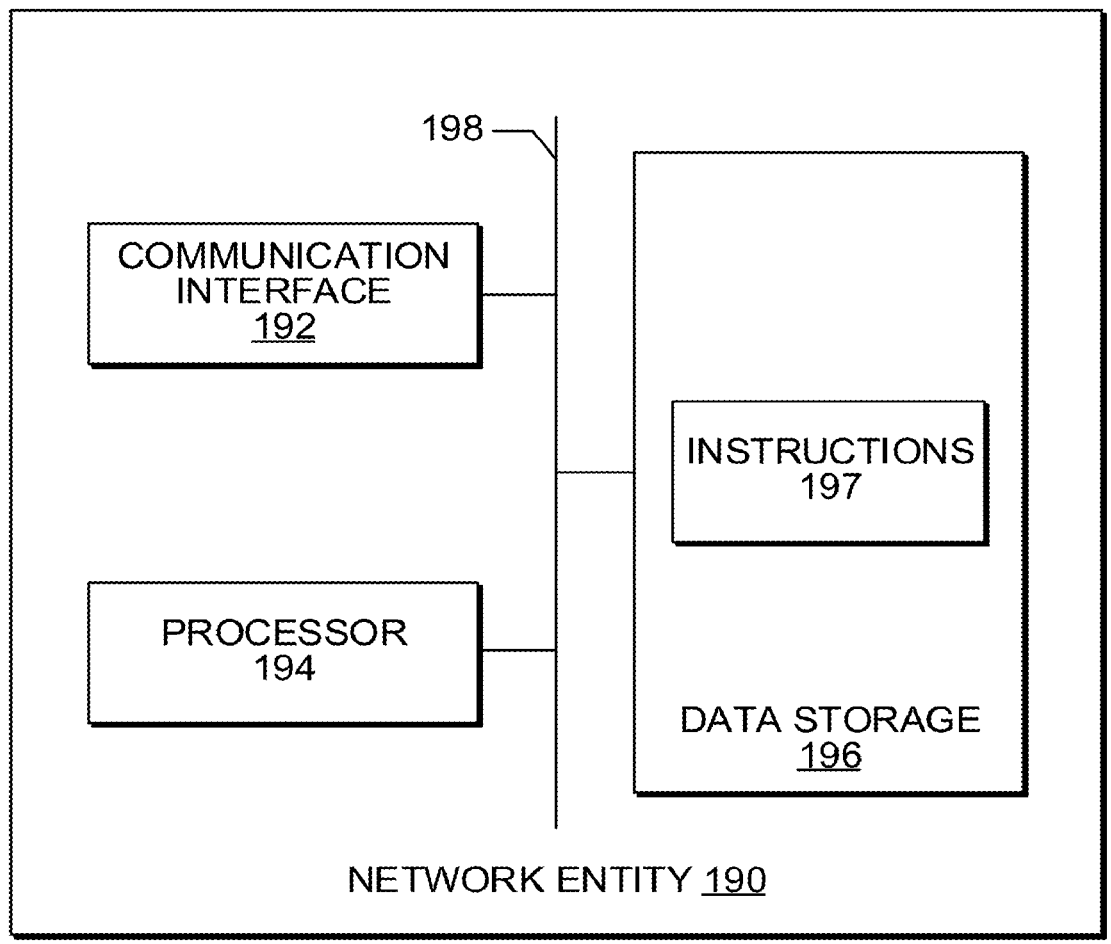
FIG. 1F depicts an exemplary network entity that may be used within the communication system of FIG. 1A.

FIG. 1F depicts an example network entity 190 that may be used within the communication system 100 of FIG. 1A. As depicted in FIG. 1F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1F. In some embodiments, one or more of such functions are carried out by a set of multiple network entities in combination, where each network entity has a structure similar to that of network entity 190 of FIG. 1F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node-B 140a, Node-B 140b, Node-B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP-HA 184, AAA 186, and gateway 188. And certainly other network entities and/or combinations of network entities could be used in various embodiments for carrying out the network-entity functions described herein, as the foregoing list is provided by way of example and not by way of limitation.

Addressing Simplified Precoder Design

For traditional design of precoders for MIMO transmissions, a precoder is designed based on an actual MIMO channel to use between the transmitter and receiver. For mmWave MIMO transmissions, current hybrid precoder designers estimate the desired precoder from the RF channel and then design a combined RF and baseband precoder that minimizes the difference between the desired precoder and the combined precoders (see Alkhateeb, Ahmed, Jianhua Mo, Nuria González-Prelcic, & Robert W. Heath. *MIMO Precoding and Combining Solutions for Millimeter-Wave Systems*. 52 IEEE COMMUNICATIONS MAGAZINE, no. 12, 122-131 (August 2014).). Further simplifications to precoder design may be possible by separating a single precoder into RF and base-band precoders.

Addressing Beam Training Overhead

Current beamforming training mechanisms may allow various search algorithms for beam training and sector sweep mechanisms. However, such search algorithms increase beam training overhead in the system. Methods to reduce overhead are presented.

Addressing Sector Sweep Methods for mmWave Precoding

For mm Wave transmissions, an initial beam sweep may be performed to enable the transmitter and receiver to communicate. This sweep is called a sector level sweep in 802.11ad (a similar transmitter and receiver sector selection procedure may be used in 5G networks). Enhanced sector level sweep procedures may apply to both simplified and exact precoder design.

General Precoder Design

An exemplary embodiment relates to a simplified precoder design. As described in Alkhateeb, Ahmed, Jianhua Mo, Nuria Gonz lez-Prelcic, & Robert W. Heath. *MIMO Precoding and Combining Solutions for Millimeter-Wave Systems*. 52 IEEE COMMUNICATIONS MAGAZINE, no. 12, 122-131 (August 2014), a precoder is designed while keeping in mind the following equation:

$$F_{eff} = F_{RF} * F_{BB}$$

where $F_{eff}$ is the effective precoder. $F_{RF}$ is the radio frequency or analog precoder, and $F_{BB}$ is the digital or baseband precoder. Two exemplary methodologies may be used to design a precoder: using an effective channel given an RF precoder and using an actual channel. Using an effective channel given an RF precoder results in an approximate precoder design. Also, an RF precoder may be viewed as a cell or BSS, and a baseband precoder may be viewed as a responder, STA, or UE. Using an actual channel results in an exact precoder.

Methods and procedures have been proposed for an exact precoder for 802.11ay assuming performance of a sector-level sweep and beam refinement to get an exact channel. Such a procedure estimates an effective channel ($H_{eff}$) by combining a sector level sweep and a beam refinement. An optimal precoder ($F_{opt}$) is found based on the estimated channel ($H_{eff}$). An analog precoder ($F_{RF}$) and a digital precoder ($F_{BB}$) are found so that the following equation is minimized:

$$\min \| F_{opt} - F_{rf} * F_{bb} \|^2$$

Approximate Precoder Design Optimization

In an exemplary embodiment related to simplified precoder design, design complexity for an approximate precoder design may be further reduced by performing a two-stage optimization. Stage 1 finds an analog precoder ($F_{RF}$) for N streams that best fits a suitable metric, such as capacity or SNR. An effective channel ($H_{eff}$) may be found given stage 1's analog precoder or via another method. Stage 2 estimates a baseband precoder based on an effective channel.

Stage 1 may be performed by an analog beam sweep procedure. For 802.11ay, an analog beam sweep procedure may be implemented only by an enhanced Sector Level Sweep (eSLS) or a combination of eSLS and an enhanced BRP. For 5G networks, stage 1 selection may be performed by a beam-based acquisition procedure.

An effective channel ($H_{eff}$) may be found given selection of an analog precoder via stage 1, or $H_{eff}$ may be found via another method. $H_{eff}$ may be found using feedback obtained from stage 1 or using a separate channel estimation procedure. For 802.11ay, a mmWave null data packet with N orthogonal channel estimation fields (where N represents the number of streams) may be sent to re-estimate a channel without performing additional beam tracking. This method performs beam tracking in a digital domain. For 5G networks, a beamformed Channel State Information Reference Signal (CSI-RS) may be transmitted to enable the UEs estimate an effective channel. A beamformer is an analog precoder selected by UE(s). This channel estimation procedure may be performed for a specific UE/STA or may be broadcast for multiple UEs/STAs.

Stage 2 estimates a baseband precoder based on an effective channel ($H_{eff}$). In one exemplary embodiment, an effective channel is fed back to a transmitter (AP/BTS/beam), and a transmitter estimates a precoder ($F_{BB}$). This feedback may be explicit (in which feedback is a quantized version of complex channel elements). Alternatively, feedback may be implicit (in which feedback is based on a codebook). Also, feedback may be compressed, such as sub-6 GHz 802.11 that uses a compression based on Givens rotation.

For another exemplary embodiment, a receiver estimates a precoder based on an effective channel and feeds this value back to an access point (AP). Again, feedback may explicit or implicit. Also, feedback may be compressed, as before. Feedback may use an existing tap delay line framework, such as found in 802.11ad, updated for MIMO feedback. Feedback may be based on a codebook such as found in 3GPP LTE Release 8-13. A system may convert TDL MIMO channels to the frequency domain and feed a MIMO channel back for each frequency band.

A precoder design may differ for each waveform type (such as single carrier or OFDM/A). For a single carrier frame, a precoder may be designed for each channel tap. For an OFDM/A frame, a precoder may be designed for each frequency sub-band. In one exemplary embodiment, a precoder may be designed for each tap and may find an effective precoder in the frequency domain. A precoder may optimize: both power and direction, direction only, or power only. If a precoder optimizes both power and direction, for example, the precoder may use a right singular matrix (from the SVD of the effective channel after RF precoding) and optimized power based on water filling. If a precoder optimizes only direction, for example, the precoder may use a right singular matrix (from an SVD for an effective channel after RF precoding) with equal power for each dimension. If a precoder optimizes only power, the precoder may optimize power for each RF beam.

Reducing Beam-Training Overhead with Leaky Wave Antennas

Figure 13A:
FIG. 13A depicts a 2-dimensional graph of leaky wave antenna wave forms.

Exemplary methods are described here to reduce beam-training overhead. Frequency scanning leaky wave antennas (LWA) offer different antenna patterns for different frequencies as shown in FIG. 13A. For example, these different antenna patterns may be slightly distorted versions of each other with a main peak progressively leaning more and more to one direction as frequency is increased. These patterns may be used to determine direction of arrival.

Figure 13B:
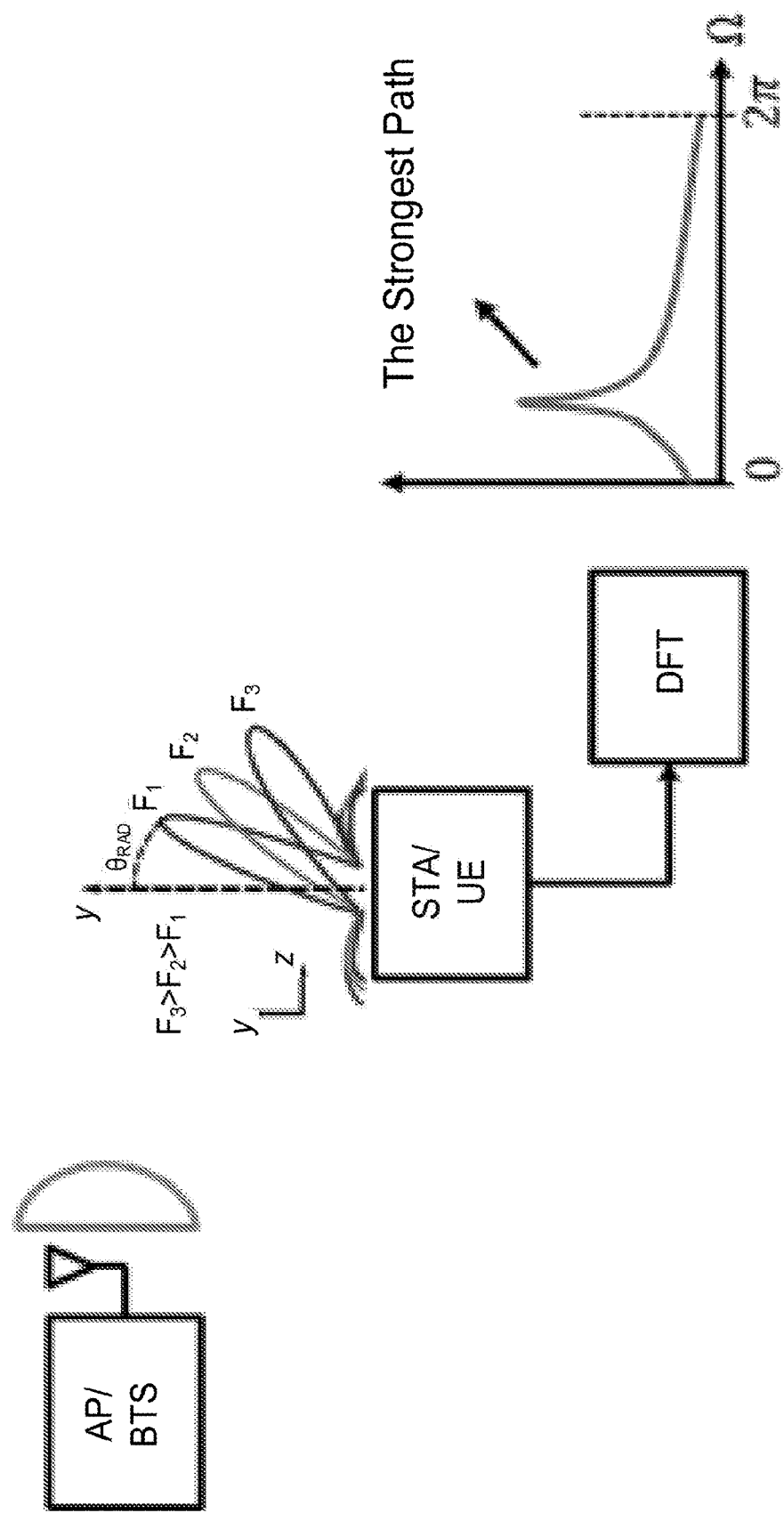
FIG. 13B depicts a block diagram of a STA/UE calculating the direction of a beam's strongest path.

FIG. 13B illustrates a process to determine the direction of a beam's strongest path. If a phased antenna array structure has frequency scanning LWA characteristics, a beam's direction may be found by using the following exemplary embodiment. An AP/BTS configures an antenna weighting vector to generate a quasi-omni (QO) antenna pattern. An AP/BTS sends a training signal, as shown on the left side of FIG. 13B. The middle of FIG. 13B shows an STA/UE using a leaky wave antenna to receive a transmitted training signal. An STA/UE applies an N-point Discrete Fourier Transformation (DFT) to a received training signal. An STA/UE finds a frequency with maximum amplitude. An STA/UE may use a table which maps frequency-to-scanning angle to determine an angle-of-arrival of a signal. An STA/UE configures antenna weighting vectors using an obtained angle-of-arrival. STA may also estimate a channel based on a frequency scanning antenna pattern and a DFT result.

Figure 14A:
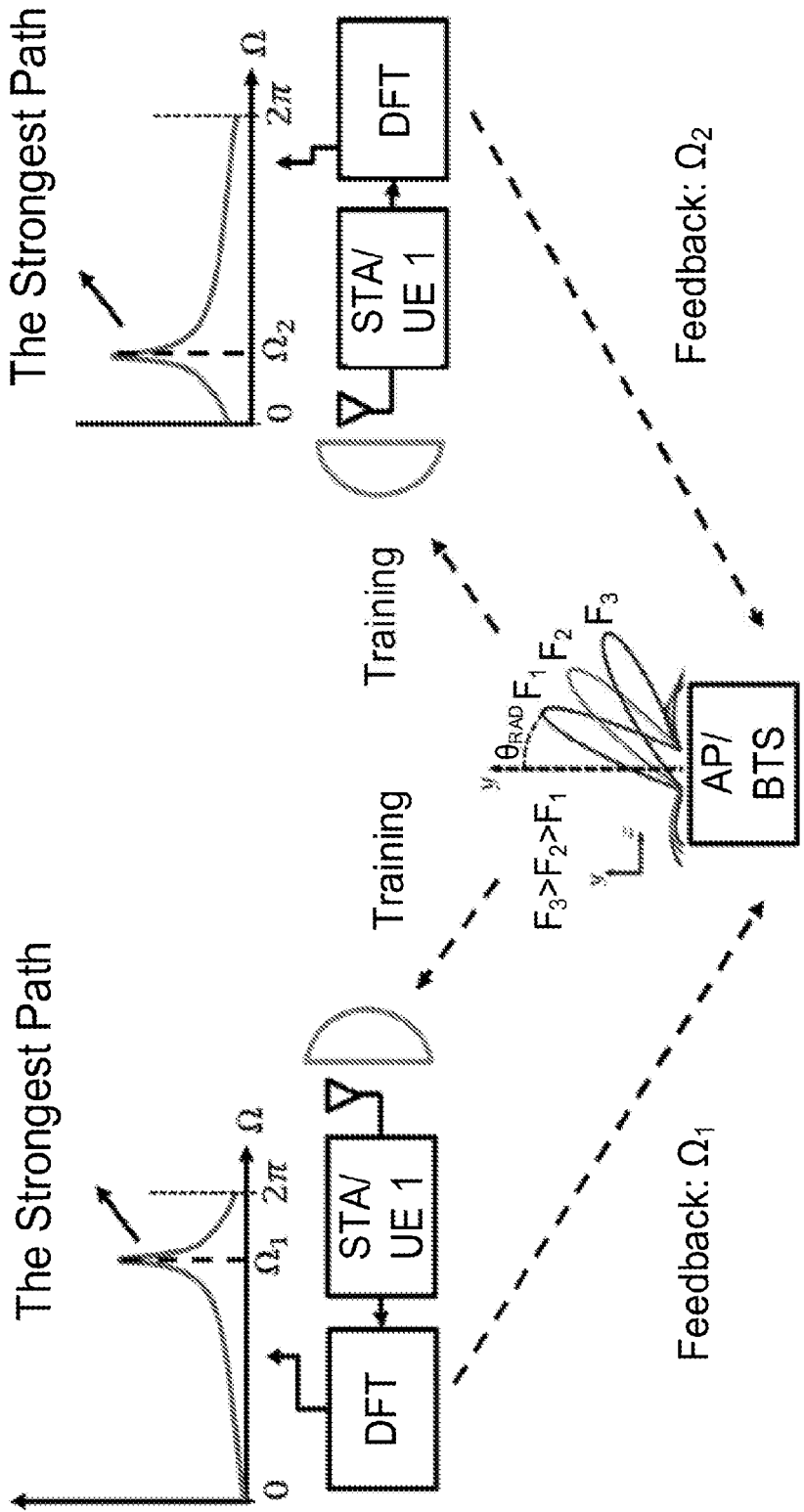
FIG. 14A depicts a block diagram of an AP/BTS calculating the location of STAs.

FIG. 14A illustrates a process to determine a location of an STA. An AP/BTS configures its antenna pattern to generate frequency scanning antenna pattern. An AP/BTS sends training signals. STAs/UEs configure their antenna weighting vectors to generate quasi-omni antenna patterns. STAs/UEs apply an N-point Discrete Fourier Transformation (DFT) to a received training signal. STAs/UEs find a frequency with a maximum amplitude. STAs/UEs feed back to an AP frequencies with maximum amplitudes. An AP/BTS uses maps frequency-to-scanning angle to determine directions of STAs. An AP/BTS uses STA directional information to adjust AP/BTS antenna weighting vectors. STAs may also feed back complete or partial DFT results.

Figure 14B:
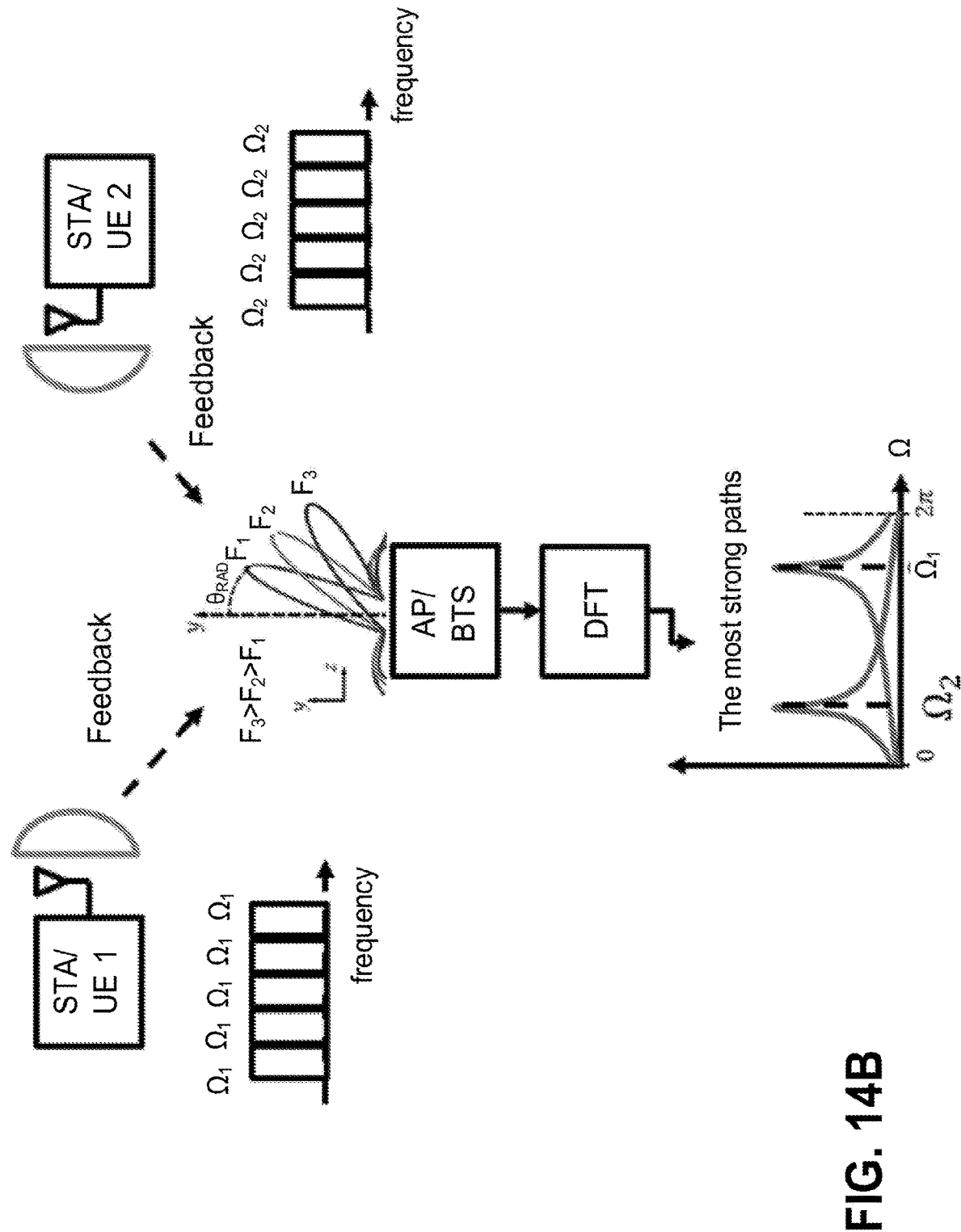
FIG. 14B depicts STA/UE1-2 repeating frequency information in frequency domain and AP/BTS keeps its antenna configuration.

In another embodiment, the feedback information may be generated by repeating feedback information (e.g., R repetitions) in frequency domain, in order to enable "simultaneous" feed back from different users. For example, as illustrated in FIG. 14B, after a training session (e.g., as in FIG. 14A, treated as a phase 1), in a "phase 2" the UE/STAs feed back the DFT results (e.g., N bin indexes with the highest amplitudes), by repeating it in the frequency domain. The AP/BTS does not change its antenna configuration (and its frequency scanning property) and calculates the DFT of received signal. Due to frequency scanning nature, AP learns the best beam for UE/STAs after DFT operation and separate feedback signals from different user. This operation can be extended to analog feedback. Ideally, the DFT result and the feedback information should match. Hence, this mechanism can be used for beam tracking purposes in mobile scenarios.

In another embodiment, the transmitter may use frequency scanning property to estimate the channel. The procedure for this operation is given as follows:
1. Transmitter forms its PAA with frequency scanning property.
2. Transmitter sends a sequence known at the receiver.
3. Receiver calculates the FFT of the signal and resolves the paths.
4. Receiver calculates the phase information of the resolved paths.

Frequency Scanning PAAs

The property of LWA antennas, i.e., frequency scanning, can be achieved by using a standard PAA where the antenna elements have no frequency scanning property. In one embodiment, it should be noted that it is possible to construct a PAA with frequency scanning property by employing a special phase shifters where the amount of the phase shift changes with frequency. This is because of the fact the AWV determines the direction of the boresight for a given frequency in standard PAA. If the amount of the phase shift changes for each antenna element with the frequency, (e.g., within the bandwidth of 2 GHz), different frequency components of the signal will be transmitted to different directions. Hence, a standard PAA will be equipped with frequency scanning property with this approach.

In another embodiment, it should be noted the transmitter and receiver may consider a software controllable phase shifters to enable and disable frequency scanning feature to enable reliable reception of the feed back properly, simultaneous beam training, or directional communications. Therefore, three different modes may be introduced in the radios; quasi-omnidirectional, directional, and frequency scanning mode.

Signal Quality Enhancement for Frequency Scanning Antennas

Since different frequency components of the signal are transmitted to different directions with frequency scanning antennas, the amount of the received signal power may be low. In this case, the transmitter may
1. increase the signal power,
2. transmit multiple sequences to increase the gain during the period where frequency scanning property of the antenna is exploited. It is worth nothing that one advantage of frequency scanning antenna is to train multiple stations/UEs simultaneously, which decreases the latency significantly.

Approximate Precoding with Enhanced SLS (eSLS1) for SU-MIMO Transmission

Figure 15:
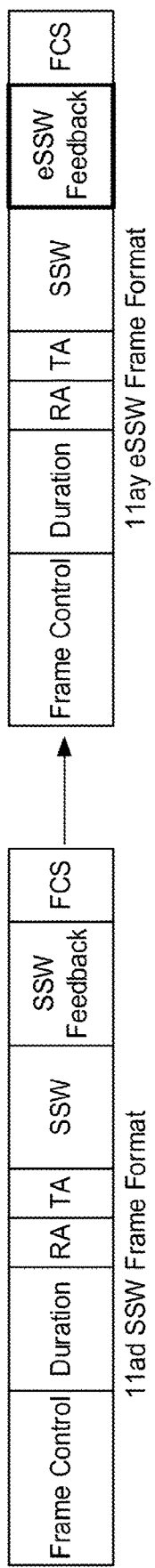
FIG. 15 depicts a message bit structure for an enhanced sector sweep frame.
Figure 16:
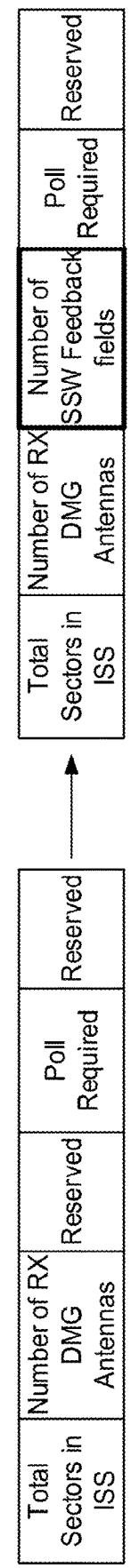
FIG. 16 depicts a message bit structure for an enhanced sector sweep feedback field.

Exemplary embodiments of enhanced sector level sweep procedures and associated feedback may be used in the design of an exemplary approximate precoder. FIGS. 14-18 show various components of such a design. It may be assumed that there are $N_{dim}$ non-time dimensions available (polarization, panel/PAA/eDMG antenna) and N transmission streams desired by the system. In one embodiment, an initiator transmission (TXSS) begins a transmit sector sweep by sending an enhanced SSW frame, as illustrated in FIG. 15, for each sector within each $N_{dim}$ dimension. An eSSW frame modifies an SSW feedback field to allow for feedback of N sectors during an SLS procedure.

A responder sets its antenna to a multi-dimensional ($N_{dim}$-dimensional) quasi-omni pattern, which is a pattern from when an enhanced Directional Multi-Gigabit (eDMG) antenna operates with the widest beam width attainable on each independent non-time dimension (or polarization {vertical/horizontal}; or physical antenna array). For one scenario with multiple receive PAAs, if there is an N-sector feedback requirement, then N non-time dimensions may be set as active at the same time (e.g., if there are 6 DMG antennas, as in 802.11ad, each antenna is evaluated separately). In eDMG, there may be as many as fifteen combinations of antennas through which to sweep. For a configuration with a single polarization and single PAA, where multiple streams are separated by time, a responder may set a single QO pattern.

Figure 17:
FIG. 17 depicts a message bit structure for exemplary sector sweep feedback frames.

A responder feeds back to a transmitter information on the best N transmit sectors based on multi-dimensional QO reception at a responder. Responder Feedback may be an updated SSW Feedback Field (FIG. 16) to incorporate additional information, as shown in FIG. 17. For one exemplary embodiment, an N sector select fields may be added into an existing feedback frame. If more than one receiver QO dimension exists, N sector selects per QO dimension may be added. For another exemplary embodiment, a legacy frame structure may be used for backwards compatibility by adding N−1 sector selects to a control trailer.

A control trailer is signaled using reserved bits in a header to indicate to non-legacy STAs that additional information may be located behind a payload. A quality level may be signaled using, for example, the format shown in FIG. 18. This feedback may include the following fields: an SNR report (including an SNR report of primary links, an SNR report of primary and cross links, and a single composite SNR report of primary and cross links), a Complex MIMO channel (which may use a BRP format, such as I/Q and τ for N taps), and a rank or condition number of composite MIMO channels.

An Initiator RXSS may be configured to receive sector sweep of an initiator. A responder sweeps its sectors while an initiator keeps its beam for the best sector found from a TXSS. Alternatively, the responder may set its beam to a quasi-omni beam pattern for each non-time dimension. In some exemplary embodiments, an initiator may perform a receive sector sweep. An initiator may set its transmit beams to the N-beams selected by feedback or set its beam to a quasi-omni beam pattern for each non-time dimension. A responder will down-select its multi-dimensional QO options to N-QO options. A responder may sweep through the sectors in its N-OQ dimensions and select N-receive sectors for each SSW frame transmitted from an initiator. Efficiency may be improved by choosing multiple sectors from separate dimensions (configurations 2, 3, and 4), but this method may require a priori signaling. For closed-loop operation, a receiver may feed back information to a transmitter. FIG. 18 shows an example and includes an effective MIMO channel at each tap delay (such as in eBRP feedback). This scenario does not use beam indices.

An exemplary embodiment may be used for optional channel estimation. Periodically, an orthogonal CEF may be transmitted on optimal beams, and a channel may be fed back to adjust the design. An NDP-A may be sent with an NDP, and an STA may feed back an effective channel in an RXSS. This feedback is effectively an RXSS without a receiver sweep of its analog beams.

Data transmission of responder feedback may be open or closed-loop (based on a precoder designed using feedback). For single carrier feedback, a precoder, for example, may be designed for each tap delay. For OFDMA operation, a precoder, for example, may be designed for each frequency band.

Figure 19:
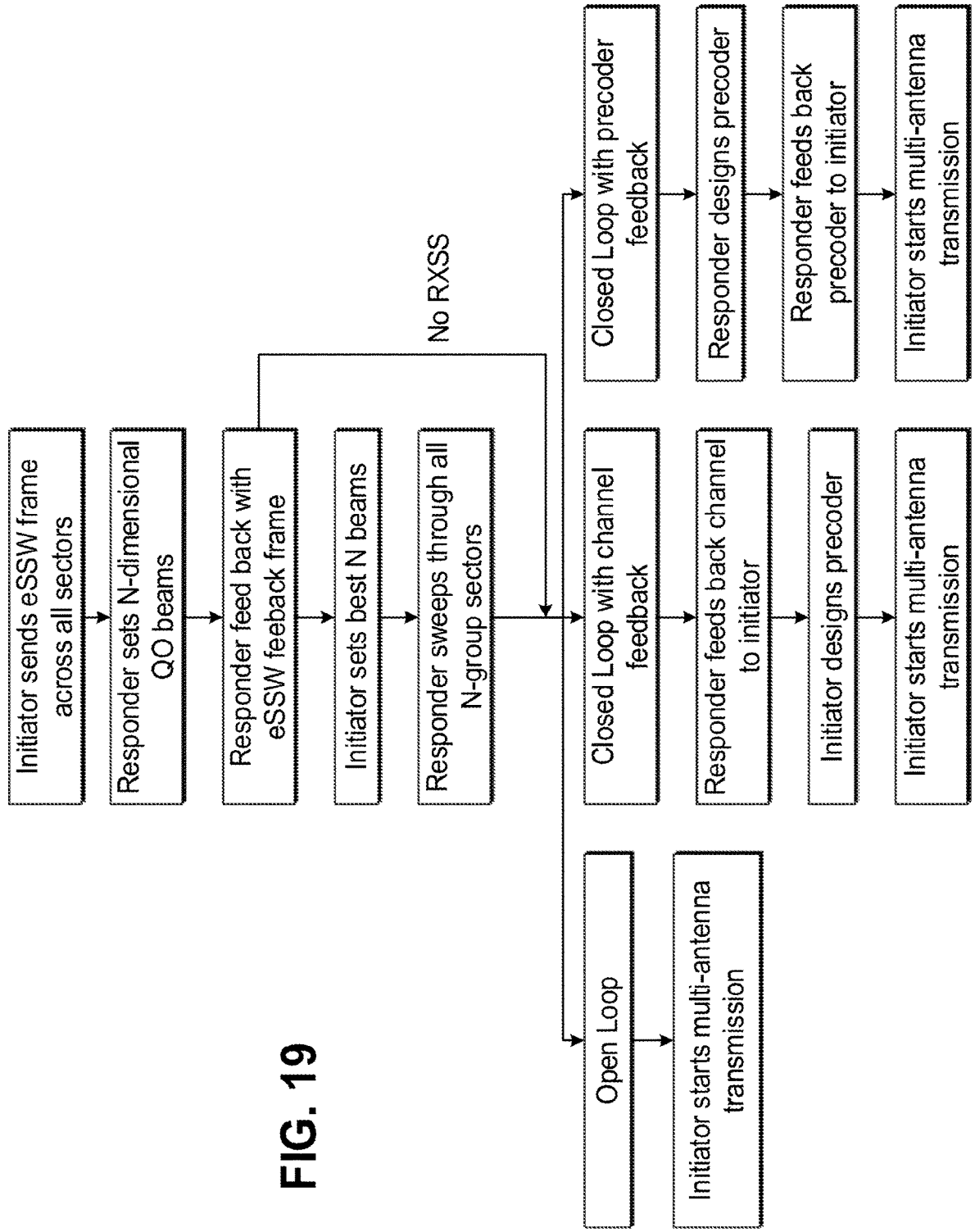
FIG. 19 depicts a flowchart for single-stage approximate precoding with enhanced SLS for SU-MIMO transmissions.

An exemplary method to design a baseband (BB) precoder may design the BB based on an effective channel with eSLS beams. In one embodiment, the system may find the best $F_{RF}$ based on capacity, SNR, and related factors. The system may also find $H_{eff}$ given $F_{RF}$. The system may also feed $H_{eff}$ back into the design. The system may also find $F_{BB}$ given $H_{eff}$. FIG. 19 depicts a flow chart of the procedure outlined above.

Although terminology for 802.11ay is used, for 5G networks, an SSW frame may be set up as a beam selection frame, where each SSW frame has a beam selection reference signal or beam synchronization signal. A responder in this exemplary embodiment has a UE as opposed to an STA.

For STA to AP transmission, a responder TXSS and responder RXSS may be implemented with the roles of the initiator and responder switched in the procedure detailed above.

Approximate Precoding with Enhanced SLS (eSLS2) for SU-MIMO Transmission (Multi-Stage Method)

An exemplary enhanced sector level sweep procedure and associated feedback may be used in an approximate precoder's design. As opposed to the first method mentioned earlier, assume a multi-stage procedure where additional stages identify best transmit/receive sectors given prior stages. This method assumes that multiple streams will identify different transmit/receive beams. The feedback signaling will accommodate this design philosophy.

An exemplary embodiment uses a two-stage procedure. Stage 1 identifies the best Tx/Rx sectors. Stage 2 identifies the next best Tx/Rx sectors given the Tx/Rx sectors selected in stage 1. In this method, a responder feed back adds more information on each iteration. An exemplary procedure begins with initiator TXSS1 sending an enhanced SSW (eSSW) frame for each sector, as shown in FIG. 15. An eSSW frame modifies an SSW feedback field to allow for feedback of N sectors during an SLS procedure. A responder sets its antenna to a single QO pattern for each dimension (or PAA or polarization). A responder feeds back to a transmitter information on the best transmit sector based on single QO reception at a responder. In this multi-stage procedure, responder feedback may use a stage 1 SSW Feedback Field, as shown in FIG. 20.

Figure 21:
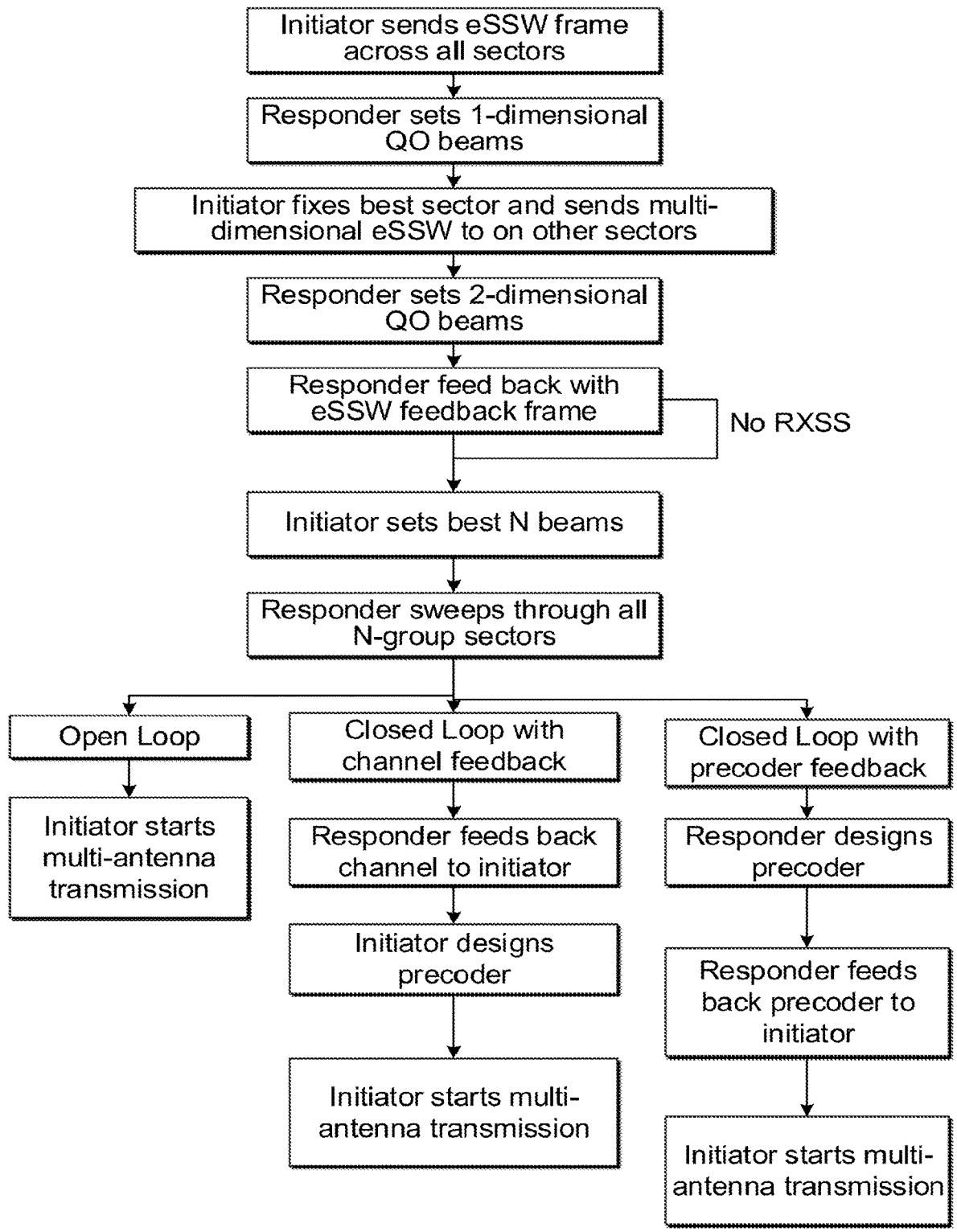
FIG. 21 depicts a flowchart for multi-stage approximate precoding with enhanced SLS for SU-MIMO transmissions.

Initiator TXSS2 sends an enhanced SSW frame (FIG. 15) with orthogonal channel estimation fields with the sector chosen in TXSS1 fixed while sweeping all other sectors. A responder sets its antenna to a 2-D QO pattern with a first QO antenna fixed based on TXSS1. A responder feeds back information on the best additional transmit sector to the transmitter based on 2-D QO reception at the responder. A responder may feed back incremental information. In one exemplary embodiment, a responder may use an updated stage 2 eSSW Feedback Field, as shown in FIG. 20. This process continues until N is reached. This procedure eSLS2 then continues, similar to eSLS1. FIG. 21 illustrates a flowchart for this process as described above.

Although terminology for 802.11ay is used, for 5G networks, an SSW frame may be set up as a beam selection frame, where each SSW frame has a beam selection reference signal or beam synchronization signal. A responder in this exemplary embodiment has a UE as opposed to an STA.

Exact Precoding with Enhanced SLS for SU-MIMO Transmission

Figure 22:
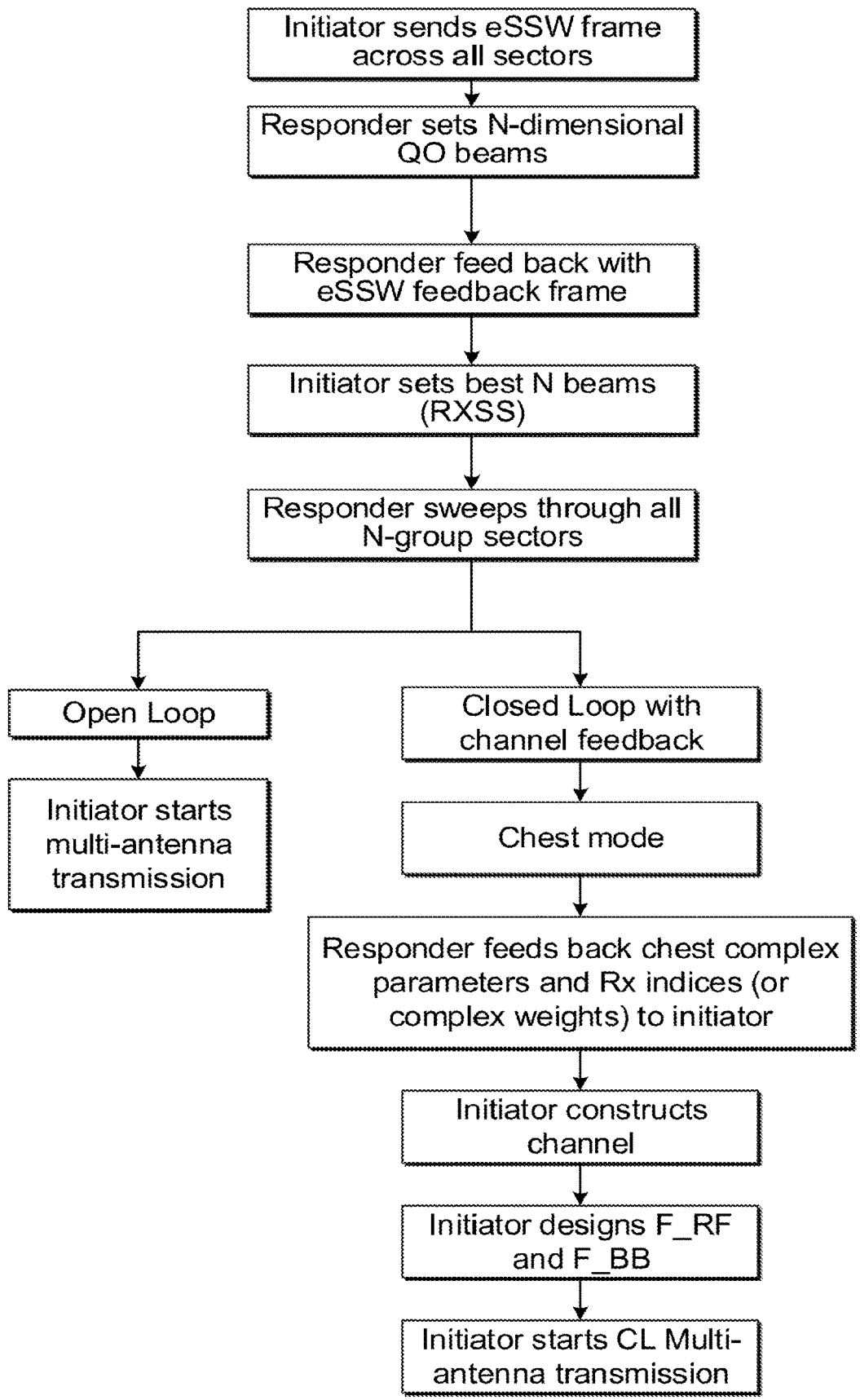
FIG. 22 depicts a flowchart for exact precoding with enhanced SLS for SU-MIMO transmissions.

A further exemplary method implements an exact precoder using results from only a sector level sweep without a Beam Refinement Protocol. In eSLS1 and eSLS2, $N_{BB}$ RF weights are assumed to map to channel rays. In reality, an actual channel will be a linear combination of $N>N_{BB}$ RF weights. Using the way in which weights may be combined, the exact channel may be estimated and $F_{RF}$ and $F_{BB}$ may be designed for this exact channel. This procedure uses both TXSS and RXSS and is based on an exact precoding method. FIG. 22 shows a flowchart for this procedure.

In an embodiment, the following process may be used. An SLS procedure executes as shown in the eSLS1 and eSLS2 procedures. Then, N is set to be greater than $N_{BB}$. Alternatively, all beams that have any energy are estimated and fed back. A responder may feed back an index of the N-best beams while keeping track of corresponding QO reception dimensions. One exemplary embodiment of this process may reuse eSLS1 frame formats without exact channel feedback. Performing an RXSS may ensure proper estimation of an actual channel. An initiator may go into chest mode to estimate the actual channel, and assumes $H=A_A^H Z A_D$, where Z is diagonal. The initiator sends a channel estimation start frame, and sends a parameter to indicate a size of $A_D$ or Z. An initiator sets transmit beams to N selected beams ($\sim A_D$). A responder sets receive beams to N selected beam $A_A$. An initiator sets transmit baseband to $A_D^H(A_D A_D^H)^{-1}$. A responder sets receive baseband to $(A_A^H A_A)^{-1} A_A$. Send orthogonal CEF to estimate elements of a channel and then construct the channel. A responder feeds back an effective channel to a transmitter. Feed back I/Q elements of Z in specific order based on size sent in estimation start frame. A transmitter constructs an actual channel and designs $F_{RF}$ and $F_{BB}$. FIG. 22 illustrates a flowchart of the process just described above.

Although terminology for 802.11ay is used, for 5G networks, an SSW frame may be set up as a beam selection frame, where each SSW frame has a beam selection reference signal or beam synchronization signal. A responder in this exemplary embodiment has a UE as opposed to an STA.

Detailed Procedures and Mechanisms for SU-MIMO and MU-MIMO Hybrid Beamforming

Hybrid Beamforming Capability

To implement hybrid beamforming (HB), STA capability to support hybrid beamforming may be specified and carried in management and/or control frames, such as Association/Re-association/De-association request/response frames. Beacon frames, enhanced/EDMG BRP frames etc. It may also be carried as part of the BRP setup frame, MU-MIMO setup frame or SU-MIMO setup frame as part of the beamforming capability element field. For example, Hybrid Beamforming capable field may be carried in one or more of the following elements or fields:

Extended Capabilities field in Enhanced/EDMG Capabilities element. For example, a Capabilities ID may be assigned to Hybrid beamforming capability. The Hybrid beamforming field may, in the future, include
Maximum number of transmit data streams supported
Maximum number of receive data streams supported
Number of transmit and receive antennas
Close loop baseband precoding supported
Open loop baseband precoding supported
Antenna/Polarization selection supported
Enhanced or EDMG Extended Schedule element
Enhanced or EDMG Beam Refinement element
Beamforming Capability field element Alternatively, the above discussed Hybrid beamforming field may be included in the other field, subfield, element or sub-element.

Baseband Beamforming Procedures in Single User Transmission

Hybrid beamforming transmission may be set up and/or negotiated by both the transmitter and the receiver. In order to do so, in one embodiment the following steps may be performed:

Step 1: The exchange of HB capabilities between the initiator and the responder.
Step 2: Setting up HB for upcoming MIMO transmission between the initiator and the responder.
Step 3: Baseband hybrid beamforming training and feedback between the initiator and the responder.

Figure 23:
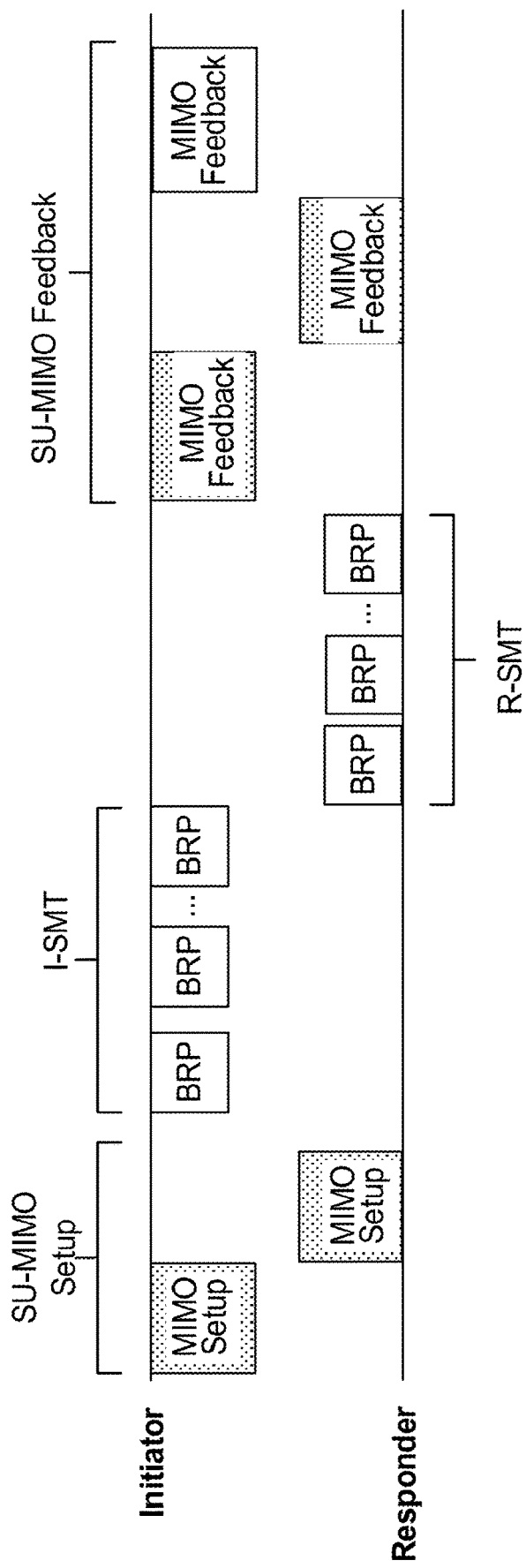
FIG. 23 depicts an example of HB in SU-MIMO beamforming protocol.

In different protocol embodiments, some of the above steps may be mandatory and some steps may be optional. Information may be exchanged by modifying the SU-MIMO beamforming protocol as illustrated in FIG. 23.

Exchange of Hybrid Beamforming Capabilities

The exchange of hybrid beamforming capabilities (step 1) may be:

An AP/PCP or an initiator may indicate support for HB and/or the intention of using HB in the following SU-MIMO transmission.
A STA or a responder may indicate ability to support HB and/or agree and/or confirm to use HB in the following SU-MIMO transmission.

The capability exchange step may happen in a Beacon/association stage (e.g., beacon frame transmission) between an AP/PCP and a non-AP/PCP STA. For transmission between non-AP/PCP STAs, the capability exchanges may be performed through the AP/PCP. For example, the AP/PCP may include HB capabilities in the enhanced/EDMG Extended Schedule Element, which may be used to schedule an allocation between the STAs. Alternatively, the capability exchange may be performed in the allocation by modifying the SU-MIMO beamforming protocol as shown in FIG. 23.

In some embodiments, the capability exchange may be carried by Beacon/association stage (e.g., beacon frame transmission) between an AP/PCP and a non-AP/PCP STA and/or signaled enhanced/EDMG Extended Schedule Element.

In some embodiments, the capability exchange may be carried by MIMO Setup frames transmitted by the initiator and responder. For example, the following field may be added to MIMO Setup frame:

HB supported: this field may be used to indicate the STA may support HB training, feedback and transmission. Once this bit is set, the STA may consider using HB transmission to communicate with the other STA. Whether to use HB transmission may depend on the future training result and may be future signaled. For example, HB transmission may be confirmed in the SU-MIMO Feedback subphase. Separate bits may be used for indicating HB with SU-MIMO and HB with MU-MIMO (see FIG. 24), or a single bit may be used for indication of both (see FIG. 25). FIG. 24 illustrates a Beamforming Capability Frame Format carried as part of the MIMO Setup frame (separate signaling). FIG. 25 illustrates a Beamforming Capability Frame Format carried as part of the MIMO Setup frame (single bit signaling).

In some embodiments, the capability exchange may be carried by MIMO Feedback frames transmitted by the initiator and responder. For example, the following field may be added to the MIMO Feedback frame:

HB supported: this field may be used to indicate the STA may support HB training, feedback and transmission. Once this bit is set, the STA may consider using HB transmission to communicate with the other STA. The STA may take an extra training step after the SU-MIMO feedback subphase to train and signal the HB transmission. Separate bits may be used for indicating use of HB with SU-MIMO and HB with MU-MIMO or a single bit may be used for indication for both.

Setting up Hybrid Beamforming Transmission

The HB setup (step 2) may in one embodiment be performed as follows:

An AP/PCP or an initiator may indicate the intention of using HB in the following SU-MIMO transmission.

A STA or a responder may confirm to use HB in the following SU-MIMO transmission.

The HB setup exchange may be performed by modifying the SU-MIMO beamforming protocol as shown in FIG. 23.

In some embodiments, the HB setup exchange may be carried by MIMO Setup frames transmitted by the initiator and the responder. For example, the following field may be added to MIMO Setup frame:

HB to be used: this field may be used to indicate the STA may intend to use HB transmission to communicate with the peer STA.

In one embodiment, HB transmission may be determined by the initiator, where for example the responder's HB capability is available at the initiator side. The initiator may set this bit to signal an HB transmission to the responder. Both initiator and responder may prepare baseband BF training after the exchange of MIMO setup frames and before HB MIMO transmission. The following MIMO transmission between the initiator and responder may be an HB MIMO transmission, except other signaling may overwrite the HB signaling later.

In another embodiment, HB transmission may be negotiated between the initiator and responder. The initiator may set this bit to suggest an HB transmission to the responder. The responder may respond to confirm or reject HB transmission. The following MIMO training exchanges, e.g., I-SMT and R-SMT exchanges, may follow the setting in MIMO setup frame transmitted by the initiator. The following MIMO transmission between the initiator and responder may be HB MIMO transmission to which both initiator and responder may agree.

Baseband precoding type: this field may be used to indicate the baseband precoding type to be used. For example, the following baseband precoding(s) may be signaled: Antenna/polarization selection, closed-loop precoding, open-loop precoding. This information may be signaled so that the responder may prepare its receive beams/sectors/AVWs correspondingly. In addition, the responder may prepare the type of feedback used to implement the baseband precoding desired. For example, Open-loop precoding: no feedback needed;

Antenna/Polarization selection: Feedback of best antenna/polarization index is provided;

Closed-loop precoding: feedback of baseband channel elements is provided.

Feedback Type: this field may be used to indicate the feedback type desired by the transmitter. Note that the initiator may request a feedback type rather than a baseband precoding type. Note also that the initiator and responder may negotiate on the baseband precoder type and/or feedback type desired.

In one embodiment, the HB setup exchange may be carried by MIMO Feedback frames transmitted by the initiator and responder. For example, the following field may be added to MIMO Feedback frame:

HB to be used: this field may be used to indicate the STA may intend to use HB transmission to communicate with the pair STA.

Baseband precoding type: this field may be used to indicate the baseband precoding type to be used. For example, the following baseband precoding may be signaled: Antenna/polarization selection, closed-loop precoding, open-loop precoding. Note, this may be signaled so that the responder may prepare its receive beams/sectors/AVWs correspondingly. Signaling similar to that transmitted by the MIMO setup frame may also be transmitted, e.g., feedback type.

Baseband Beam Training and Feedback

The baseband beam training and feedback (step 3) may be as follows:

An AP/PCP or an initiator may transmit a training frame to sound baseband channel and request baseband channel information feedback. The baseband channel information may be full channel state information (CSI) or partial (CSI) depending on the baseband precoding scheme to be used.

A STA or a responder may feedback baseband channel information requested by the AP/PCP or the initiator.

The training frame (as shown in FIGS. 26A-26C) may be one or more of the following:

A frame with limited CEF field(s) appended at the end of the frame. In Enhanced or EDMG header, a field may be used to indicate the appended CEF fields used and number of appended CEF field (the training packet shown in FIG. 26A).

In this case, the initiator or transmitter sets its baseband precoder to identity during transmission of the appended CEF frame to ensure that the receiver is able to measure the actual baseband channel.

A frame with extra CEF fields. For example, a PPDU with single stream transmission may usually carry one CEF field. However, in order to perform baseband channel sounding, extra CEF fields may be appended right after the CEF field which may be used to decode the data field of the current PPDU. In Enhanced or EDMG header, a field may be used to indicate the extra CEF field used and number of extra CEF field (the training packet shown in FIG. 26B).

In this case, the initiator or transmitter sets its baseband precoder to identity during transmission of the frame to ensure that the receiver is able to measure the actual baseband channel.

A BRP frame where training sequences may be appended at the end of the frame (the training packet shown in FIG. 26C).

In this case, the initiator or transmitter may set its baseband precoder to identity during transmission of the appended sequences to ensure that the receiver is able to measure the actual baseband channel.

The baseband beam training and feedback may be performed by modifying SU-MIMO beamforming protocol as shown in FIG. 23.

In one embodiment, the baseband beam training and feedback may be performed by MIMO Feedback frames transmitted by the initiator and the responder. The PPDU which may carry the MIMO Feedback frame may follow the training frame format discussed previously. The following field may be added to MIMO Setup frame:

Baseband precoding type: this field may be used to indicate the baseband precoding type to be used. For example, the following baseband precoding may be signaled: Antenna/polarization selection, closed-loop precoding, open-loop precoding. Note, this may be signaled to allow the responder may to prepare its receive beams/sectors/A VWs correspondingly.

Baseband feedback request: this field may be used to indicate certain type of channel state information feedback may be requested. For example, a full CSI feedback, a partial CSI feedback, etc.

Baseband feedback response: this field may be used to carry channel state information feedback as requested by the initiator.

A bit (for example, a direction bit) may be set to indicate whether a feedback request or a feedback response may be carried in the frame.

Figure 27:
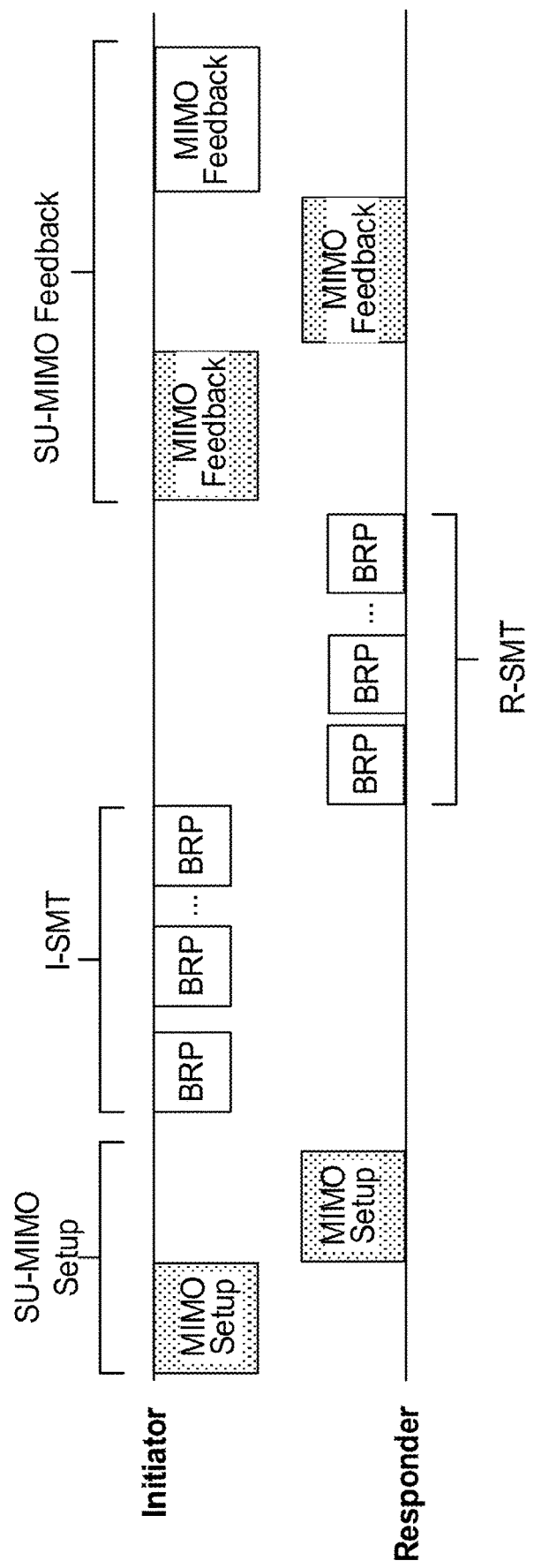
FIG. 27 illustrates an exemplary protocol for SU-MIMO Hybrid Beamforming.

FIG. 27 illustrates an exemplary protocol for SU-MIMO hybrid beamforming.

Baseband Beamforming Procedures in Multi User Transmission

Hybrid beamforming transmission may be set up and/or negotiated by both initiator and responders. In order to do so, the following steps may be performed:

Step 1: The exchange of HB capabilities between the initiator and responders.

Step 2: Setting up HB for upcoming MIMO transmission between the initiator and responders.

Step 3: Baseband beamforming training and feedback between the initiator and responder.

In different embodiments of an exemplary protocol, some steps may be mandatory and some steps may be optional. Information may be exchanged by modifying the SU-MIMO beamforming protocol shown in FIGS. 28A-28B.

Exchange of Hybrid Beamforming Capabilities

The exchange of hybrid beamforming capabilities (step 1) may proceed as follows:

An AP/PCP may indicate support for HB and/or the intention of using HB in the following MU-MIMO transmission.

A STA or a responder may indicate ability to support HB and/or agree and/or confirm to use HB in the following MU-MIMO transmission.

Figure 28A:
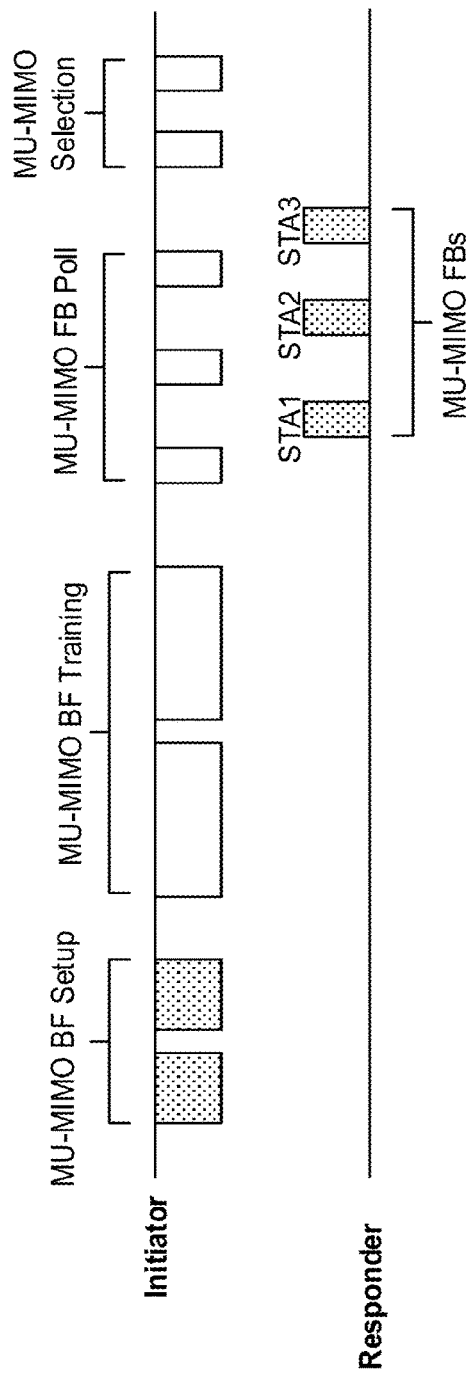
FIGS. 28A-28B illustrate enabling HB in a MU-MIMO beamforming protocol.
Figure 28B:
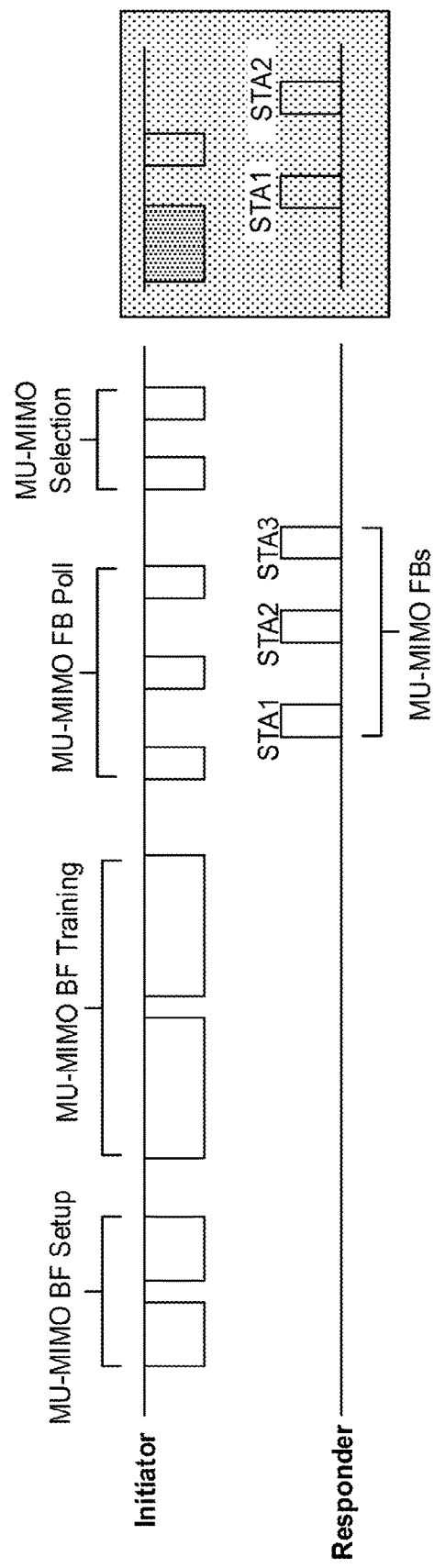

The capability exchange step may happen in Beacon/association stage (e.g., beacon frame transmission) between an AP/PCP and a non-AP/PCP STA. Alternatively, the AP/PCP may include HB capabilities in the enhanced/EDMG Extended Schedule Element, which may be used to schedule an allocation between the STAs. Alternatively, the capability exchange may be performed in the allocation by modifying the MU-MIMO beamforming protocol as shown in FIGS. 28A-28B.

In one embodiment, the capability exchange may be carried in the Beacon/association stage (e.g., beacon frame transmission) between an AP/PCP and a non-AP/PCP STA and/or signaled enhanced/EDMG Extended Schedule Element.

In one embodiment, the capability exchange may be carried by MU-MIMO BF Setup frames transmitted by the initiator and responder. For example, the following field may be added to MIMO Setup frame:

HB supported: this field may be used to indicate the STA may support HB training, feedback and transmission. Once this bit is set, the STA may consider using HB transmission to communicate with the other STA. Whether to use HB transmission may depend on the future training result and may be future signaled. For example, HB transmission may be confirmed in MU-MIMO Feedback subphase. Separate bits may be used for HB with SU-MIMO and HB with MU-MIMO (see FIG. 29), or a single bit may be used for both (see FIG. 30). FIG. 29 illustrates a beamforming capability frame format carried as part of the MIMO setup frame (separate signaling). FIG. 30 illustrates a beamforming capability frame format carried as part of the MIMO setup frame (separate signaling).

In one embodiment, the capability exchange may be carried by MU-MIMO Feedback Poll and Feedback frames transmitted by the initiator and responders. For example, the following field may be added to MIMO Feedback Poll and/or Feedback frame:

HB supported: this field may be used to indicate the STA may support HB training and transmission. Once this bit may be set, the STA may consider to use HB transmission to communicate with the other STAs. The STA may take extra baseband training step after the MU-MIMO feedback subphase to train and signal the HB transmission. For example, after MU-MIMO selection subphase.

In one embodiment, the AP/PCP may only be able to initiate HB with STAs that all support HB feedback. STAs that do not support HB may not be grouped in the HB transmission.

Setting up Hybrid Beamforming Transmission

The HB setup (step 2) may be performed as follows:

An AP/PCP may indicate the intention of using HB in the following MU-MIMO transmission.

A STA or a responder may confirm to use HB in the following MU-MIMO transmission.

The HB setup exchange may be performed by modifying the SU-MIMO beamforming protocol as shown in FIG. 23.

In one embodiment, the HB setup exchange may be carried by MU-MIMO Setup frames transmitted by the initiator and the responder. For example, the following field may be added to a MIMO Setup frame:

HB to be used: this field may be used to indicate the STA may intend to use HB transmission to communicate with the peer STA(s).

In one embodiment, HB transmission may be determined by the initiator (where the responder's HB capability may be available at the initiator side). The initiator may set this bit to signal a HB transmission to the responder. Both initiator and responder may prepare baseband BF training after the exchange of MU-MIMO setup frames and before HB MU-MIMO transmission. The following MU-MIMO transmission between the initiator and responder may be a HB MIMO transmission, except other signaling may overwrite the HB signaling later.

In another embodiment, HB transmission may be negotiated between the initiator and responder(s). The initiator may set this bit to suggest a HB transmission to a group of responders. Each responder may respond to confirm or reject HB transmission. The following MIMO training exchanges, e.g. MU-MIMO BF training and MU-MIMO FB Poll/FBs exchanges, may follow the setting in MIMO setup frame transmitted by the initiator. The initiator may consider the responses from the group of responders and perform MU-MIMO user selection. The following MU-MIMO transmission may be performed within a subset of users trained previously. HB MU-MIMO transmission may be performed when both initiator and responder(s) may agree.

Baseband precoding type, this field may be used to indicate the baseband precoding type to be used. For example, the following baseband precoding may be signaled: Antenna/polarization selection, closed-loop precoding, open-loop precoding. The signaling may be per user based or common among the group of users. Note, this may be signaled so that the responder may to prepare its receive beams/sectors/AVWs correspondingly. In addition, the responder may prepare the type of feedback used to implement the baseband precoding desired. For example, Open-loop precoding: no feedback needed;

Antenna/Polarization selection: Feedback of best antenna/polarization index needed;

Closed-loop precoding: feedback of baseband channel elements is needed.

Feedback Type: this field may be used to indicate the feedback type desired by the transmitter. Note that the initiator may request a feedback type rather than a baseband precoding type. Note also that the initiator and responder may negotiate on the baseband precoder type and/or feedback type desired.

In one embodiment, the HB setup exchange may be carried by MU-MIMO Feedback Poll and FB frames transmitted by the initiator and responder(s). For example, the following field may be added to MU-MIMO Feedback Poll and/or FB frame:

HB to be used: this field may be used to indicate the STA may intend to use HB transmission to communicate with the pair STA.

Baseband precoding type: this field may be used to indicate the baseband precoding type to be used. For example, the following baseband precoding may be signaled: Antenna/polarization selection, closed-loop precoding, open-loop precoding. The signaling may be per user based or common among the group of users. This may be signaled so that the responder may to prepare its receive beams/sectors/AVWs correspondingly.

Base band Beam Training and Feedback

The baseband beam training and feedback (step 3) may be performed as follows:

An AP/PCP may transmit training frame to sound baseband channel of each responder and request baseband channel information feedback. The baseband channel information may be full channel state information (CSI) or partial (CSI) depending on the baseband precoding scheme to be used.

A STA or a responder may feedback baseband channel information requested by the AP/PCP or the initiator.

The training frame may be (as shown in FIGS. 26A-26C):

A frame with limited CEF field appended at the end of the frame. In Enhanced or EDMG header, a field may be used to indicate the appended CEF fields used and number of appended CEF fields.

A frame with extra CEF fields. For example, a PPDU with single stream transmission may usually carry one CEF field. However, in order to perform baseband channel sounding, extra CEF fields may be appended right after the CEF field which may be used to decode the data field of current PPDU. In Enhanced or EDMG header, a field may be used to indicate the extra CEF field used and the number of extra CEF fields.

A BRP frame where training sequences may be appended at the end of the frame.

The baseband beam training and feedback may be performed by modifying MU-MIMO beamforming protocol as shown in FIGS. 28A-28B.

In one embodiment, for a first approach (illustrated in FIG. 28A), the baseband beam training and feedback may be performed by MU-MIMO Feedback Poll and Feedback frames transmitted by the initiator and responder(s). The PPDU which may carry the MU-MIMO FB Poll and FB frame may follow the training frame format disclosed herein. The following field may be added to MU-MIMO FB Poll and/or FB frame:

Baseband precoding type: this field may be used to indicate the baseband precoding type to be used. For example, the following baseband precoding may be signaled: Antenna/polarization selection, closed-loop precoding, open-loop precoding. The signaling may be per user based or common among the group of users Note, this may need to be signaled since the responder may need to prepare its receive beams/sectors/AVWs correspondingly. This field may be in MU-MIMO FB Poll and/or FB frame.

Baseband feedback request: this field may be used to indicate certain type of channel state information feedback may be requested. For example, a full CSI feedback, a partial CSI feedback etc. This field may be in MU-MIMO FB Poll frame.

Baseband feedback response: this field may be used to carry channel state information feedback as requested by the initiator. This field may be in MU-MIMO FB frame.

Alternatively, a common MU-MIMO FB frame may be specified, where a bit (for example, a direction bit) may be set to indicate whether the frame is used as FB Poll with a feedback request or a FB with a feedback response.

In another embodiment, for a second approach (illustrated in FIG. 28B), the baseband beam training and feedback may be performed after the MU-MIMO selection subphase. The detailed procedure may be performed as follows:

The AP/PCP may indicate HB in MU-MIMO selection frame, where a subset of users may be selected to future perform MU-MIMO transmission. For example, in MU-MIMO selection frame, one or more of the following may be used:

A "HB to be used" field may be carried in MU-MIMO selection frame to indicate the HB MU-MIMO transmission.

Baseband sounding/training request field may indicate a request for extra baseband channel sounding and feedback.

Baseband feedback request: this field may be used to indicate certain type of channel state information feedback may be requested, for example, a full CSI feedback, a partial CSI feedback, etc. This field may be in MU-MIMO FB Poll frame. An exemplary MU-MIMO selection frame is illustrated in FIG. 31.

In one embodiment, the AP/PCP may transmit a training frame as disclosed in the section xIFS time after the transmission of MU-MIMO selection frame. In the training frame, Baseband feedback request field may be included. A separate frame with CEF/TRN fields is illustrated in FIG. 32.

In one embodiment, the AP/PCP may use MU-MIMO selection frame as the training frame. Extra CEF fields/TRN fields may be inserted or appended to the MU-MIMO selection frame. An exemplary MU-MIMO selection frame with parameters and CEF/TRN is illustrated in FIG. 33.

A first STA may transmit a baseband feedback frame xIFS time after the reception of the MU-MIMO Selection frame or the training frame. The other STAs may wait for polling from the AP/PCP to transmit their feedback frames. In the feedback frame, channel state information feedback may be transmitted as requested by the initiator.

In one embodiment, multiple STAs may feed back information simultaneously during a polling time over separate frequencies, e.g., in channel bonding or UL OFDMA.

In one embodiment, for a third approach with limited analog, baseband beam training and feedback may be performed after the MU-MIMO selection subphase. The detailed procedure ay be performed as follows:

The AP/PCP may indicate HB in MU-MIMO selection frame, where a subset of users may be selected to future perform MU-MIMO transmission. For example, in MU-MIMO selection frame, one or more of the following may be used.

A "HB to be used" field may be carried in MU-MIMO selection frame to indicate the HB MU-MIMO transmission.

Analog and Baseband sounding/training request field may indicate a request for extra baseband channel sounding and feedback.

Baseband feedback request: this field may be used to indicate certain type of channel state information feedback may be requested, for example, a full CSI feedback, a partial CSI feedback, etc. This field may be in MU-MIMO FB Poll frame. An exemplary MU-MIMO selection frame is illustrated in FIG. 31.

In one embodiment, the AP/PCP may transmit a training frame as disclosed in the section xIFS time after the transmission of MU-MIMO selection frame. In the training frame, Baseband feedback request field may be included. A separate frame with CEF/TRN fields is illustrated in FIG. 32.

In one embodiment, the AP/PCP may use MU-MIMO selection frame as the training frame. Extra CEF fields/TRN fields may be inserted or appended to the MU-MIMO selection frame. An exemplary MU-MIMO selection frame with parameters and CEF/TRN is illustrated in FIG. 33.

A first STA may transmit a combined analog and baseband feedback frame xIFS time after the reception of the MU-MIMO Selection frame or the training frame. The other STAs may wait for polling from the AP/PCP to transmit their feedback frames. In the feedback frame, channel state information feedback may be transmitted as requested by the initiator.

In one embodiment, multiple STAs may feed back information simultaneously during a polling time over separate frequencies, e.g., in channel bonding or UL OFDMA In an exemplary embodiment, illustrated in FIG. 34, the first approach is used in a scenario where there is no change between the BF setup and MU-MIMO selection. The MU-MIMO FB Poll may feed back all channel details and the protocol may indicate the need for detailed feedback during setup.

The second and third approaches, which are illustrated in FIG. 35, may be used in a scenario where there is a configuration change from BF setup to MU-MIMO selection, for example if the STAs selected in a specific MU-MIMO transmission by the MU-MIMO selection frame are a subset of the STAs explored in the MU-MIMO BF training and the analog beams decided in that phase are still to be used. Alternatively, the second approach may be used in a scenario where the MU-MIMO BF training may feed back information needed for MU-MIMO selection only (limiting the feedback overhead and identifying the analog beams needed) then using the analog beams selected.

Figure 36:
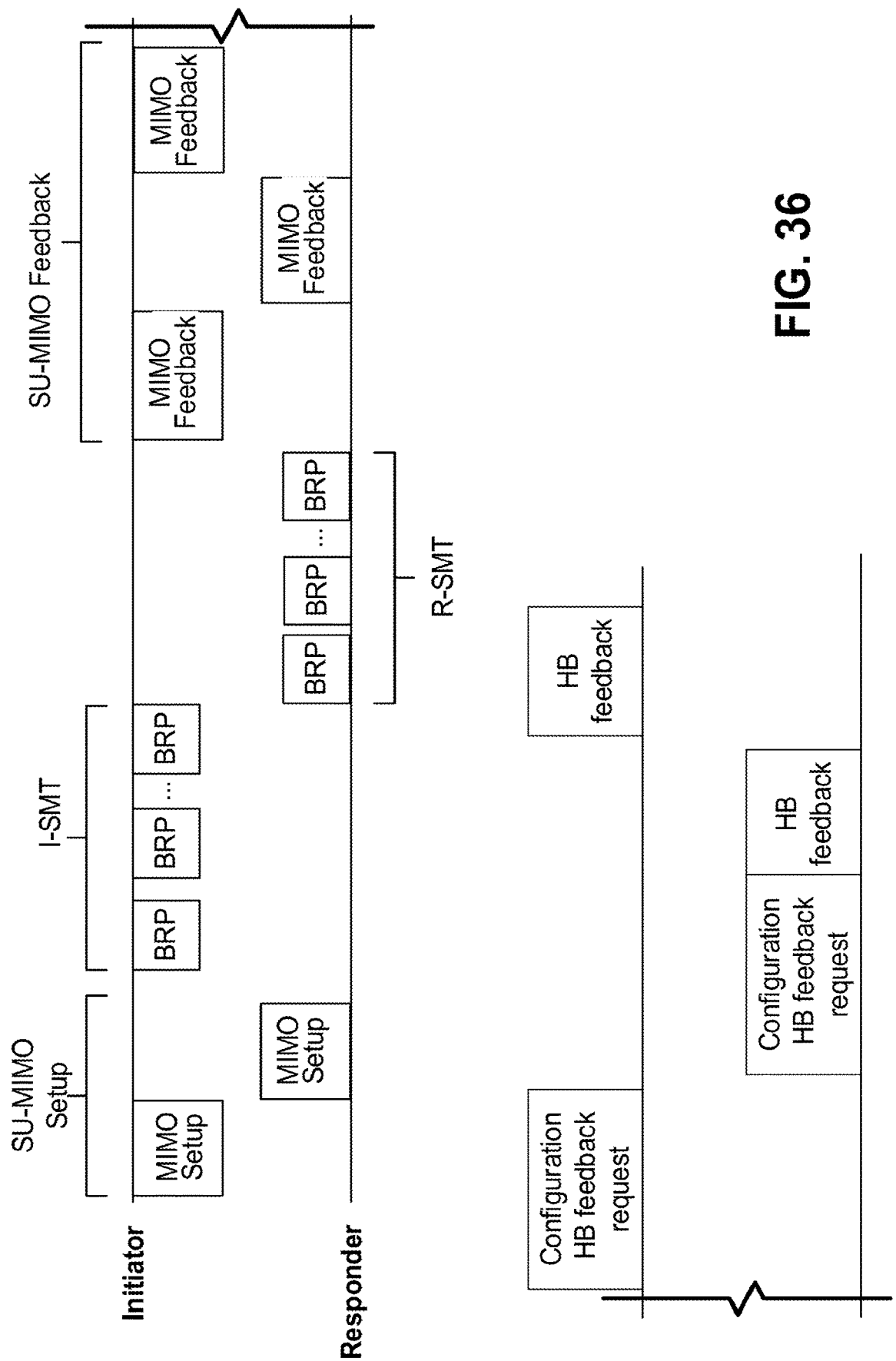
FIG. 36 illustrates a beamforming protocol according to an exemplary embodiment.

In the second approach as used for SU-MIMO: MIMO feedback in the SU-MIMO protocol may be limited to composite SU-MIMO information, e.g., the mutual information, to limit the MIMO feedback overhead. An SU-MIMO selection frame may then be sent to the responder to select the SU-MIMO configuration desired. Then an information request for the resulting baseband channel may be sent to the responder after the SU-MIMO selection frame to acquire the baseband information needed for hybrid precoding. A procedure may be performed as described above, and is illustrated in FIG. 36.

Hybrid Precoding for SU-MIMO and MU-MIMO in 802.11ay

Hybrid precoding is a combination of analog beamforming and digital baseband beamforming. The relationship between the transmitted signal, x, and received signal, Y, can be represented as:

$$Y = F_{Ar} H F_{At} F_{BB} x + n : H_{BB} = F_{Ar} H F_{At};$$

where H=Channel between Tx and Rx antennas; n=Additive white noise; $H_{BB}$=Effective baseband channel, i.e., the channel based on combining the analog beamformer(s) and the actual channel; $F_{At}$=Transmit Analog beamformer; $F_{Ar}$=Receive Analog beamformer; and $F_{BB}$=Baseband beamformer.

The elements of the hybrid precoder may be configured jointly or serially.

In a joint configuration, the analog and digital baseband beamformers may be calculated simultaneously.

In a serial configuration, the analog beamformer may be selected during the SU-MIMO or MU-MIMO beamforming setup or by considering a finite set of possible beams. After the analog beams are defined, the transmitter may obtain baseband channel information between the transmitter and receiver using the defined beams and calculate the baseband beamformer.

To enable hybrid precoding, the transmitter and receiver may exchange capability information in the beamforming capability field. The transmitter may then acquire (or otherwise request) baseband channel information, and use this information to configure the hybrid precoder.

The transmitter may acquire (or otherwise request) the baseband channel information using one or more of the following:

The transmitter may acquire the channel during SU-MIMO or MU-MIMO beamforming setup by:
- Requesting feedback of the time domain channel response in the SC mode or frequency domain channel response in the OFDM mode to the transmitter during the MIMO phase of the SU-MIMO beamforming setup
  - To support SU-MIMO hybrid beamforming, if the responder is the decision maker for the responder link, the initiator MIMO BF Feedback frame may contain the SU-MIMO beamforming training feedback for the responder SMBT subphase in the form of time domain channel feedback in the SC mode or frequency domain channel feedback in the OFDM mode.
  - To support SU-MIMO hybrid beamforming, if the initiator is the decision maker for the initiator link, the responder MIMO BF Feedback frame may contain the SU-MIMO beamforming training feedback for the initiator SMBT subphase in the form of time domain channel feedback in the SC mode or frequency domain channel feedback in the OFDM mode.
- Requesting feedback of the time domain channel response in the SC mode or frequency domain channel response in the OFDM mode to the transmitter during the MIMO phase of MU-MIMO beamforming setup.
  - The MIMO BF Feedback frame may feed back the time domain channel response in the SC mode or frequency domain channel feedback in the OFDM mode in addition to the associated quality to support hybrid beamforming.
  - To support MU-MIMO hybrid beamforming, the MU-MIMO BF Feedback frame may contain the MU-MIMO beamforming training feedback in the form of time domain channel feedback in the SC mode or frequency domain channel feedback in the OFDM mode.

Figure 37:
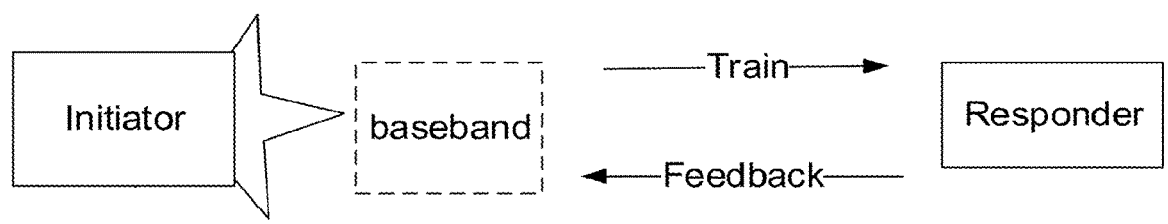
FIG. 37 illustrates one embodiment of baseband EDMG initiator transmit beam tracking.
Figure 38:
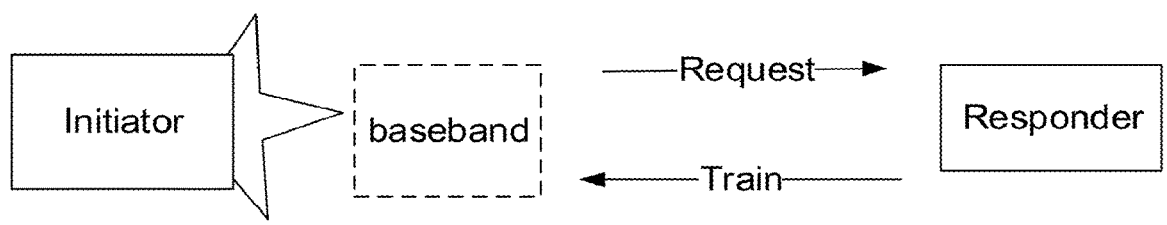
FIG. 38 illustrates one embodiment of baseband EDMG initiator receive beam tracking.

The transmitter may acquire the channel during data transmission using either analog tracking or digital baseband tracking by:
- Requesting estimation of the time domain channel response in the SC mode or frequency domain channel response in the OFDM mode by measuring and feeding back the channel from the transmitter. The channel may be measured by using the EDMG initiator transmit beam tracking procedure.
  - The initiator sends a training packet to the receiver and the receiver feeds back the desired feedback (best beam, effective channel, etc.), as illustrated in FIG. 37, for one embodiment of the baseband EDMG initiator transmit beam tracking.
- Requesting estimation of the time domain channel response in the SC mode or frequency domain channel response in the OFDM mode by measuring the reverse channel to the transmitter. The channel may be measured by using the EDMG responder transmit beam tracking or EDMG initiator receive beam tracking. This assumes channel reciprocity.
  - The initiator sends a request to the responder and the responder sends a tracking packet to enable the initiator estimate its receive beams, as illustrated in FIG. 38, for one embodiment of baseband EDMG initiator receive beam tracking.

FIG. 39 illustrates one embodiment of the Beamforming Capability field format. In the illustrated field format, the Hybrid Beamforming Supported field may be set to one to indicate that the STA supports the hybrid beamforming protocol including the Hybrid beamforming protocol described in 10.38.9.2.4 MU-MIMO beamforming. The field may be set to zero otherwise.

Additional Embodiments. In an embodiment, there is a method performed at a first transceiver, the method comprising: determining an estimate H_eff of an effective channel between the first transceiver and a second transceiver; calculating an optimal precoder F_opt based on the estimated effective channel; and selecting an analog precoder F_RF and a digital precoder F_BB to minimize the value of $\|F\_opt - F\_RF*F\_BB\|^2$.

In an embodiment, there is a method performed at a first transceiver, the method comprising: selecting an analog precoder F_RF; given the analog precoder F_RF, determining an estimate H_eff of an effective channel between the first transceiver and a second transceiver; and selecting a digital precoder F_BB based on the effective channel H_eff. The method may include wherein the analog precoder is selected based on capacity of a channel between the first transceiver and a second transceiver. The method may include wherein the analog precoder is selected based on signal to noise ratio of a channel between the first transceiver and a second transceiver. The method may include wherein selection of the analog precoder F_RF is performed using a beam sweep procedure. The method may include wherein the analog beam sweep procedure is implemented using an enhanced Sector Level Sweep (eSLS). The method may include wherein the analog beam sweep procedure is implemented using a combination of enhanced Sector Level Sweep (eSLS) and an enhanced beam refinement protocol (BRP) procedure. The method may include wherein selection of the analog precoder F_RF is performed using a beam-based acquisition procedure. The method may include wherein determining the estimate H_eff of the effective channel comprises sending a mmWave Null Data Packet with N orthogonal Channel Estimation Fields, where N is the number of streams. The method may include wherein determining the estimate H_eff of the effective channel comprises sending a beamformed Channel State Information Reference Signal (CSI-RS).

In an embodiment, there is a method comprising: at a network entity, configuring an antenna weighting vector to generate a quasi-omni antenna pattern: sending a multi-frequency training signal from the antenna of the network entity: at a user entity, receiving the training signal at a leaky wave antenna; in the received training signal, identifying a frequency with a maximum amplitude: and determining an angle of arrival of the training signal based on the frequency with maximum amplitude.

In an embodiment, there is a method performed by a user entity having a leaky wave antenna, the method comprising: receiving a multi-frequency training signal from a network entity at the leaky wave antenna; in the received training signal, identifying a frequency with a maximum amplitude; and determining an angle of arrival of the training signal based on the frequency with maximum amplitude. The method may include wherein identifying the frequency with the maximum amplitude comprises performing a discrete Fourier transform on the received training signal. The method may include further estimating the channel between the user entity and the network entity based on the discrete Fourier transform. The method may include wherein determining the angle of arrival comprises consulting a look-up table that maps frequency to scanning angle. The method may include further configuring antenna vectors of the user entity to correspond to the determined angle of arrival.

In an embodiment, there is a method performed at a network entity, the method comprising: configuring an antenna to generate a frequency scanning antenna pattern; transmitting a multi-frequency training signal from the antenna; receiving, from at least one user entity, information identifying the strongest frequency received by the user entity from the multi-frequency training signal; and determining a direction of the user entity from the identified strongest frequency. The method may include wherein determining the angle of arrival comprises consulting a look-up table that maps frequency to scanning angle. The method may include further configuring antenna vectors of the network entity to correspond to the determined angle of arrival.

In an embodiment, there is a sector level sweep method comprising: sending, from an initiator, an enhanced sector sweep (eSSW) frame for each sector; receiving, at the initiator, information from a responder on the best N transmit sectors based on multi-dimensional QO reception at the responder; and setting the N best beams at the initiator.

In an embodiment, there is a multi-stage sector level sweep method comprising: in a first stage: sending, from an initiator, an enhanced sector sweep (eSSW) frame for each sector; receiving, at the initiator, information from a responder on the best N transmit sectors based on multi-dimensional QO reception at the responder; and selecting a sector based on the information from the responder. In a second stage, the method comprises: sending, from the initiator, an enhanced sector sweep (eSSW) frame with orthogonal Channel Estimation Fields with the sector chosen in the first stage fixed while sweeping all other sectors; receiving, at the initiator, information from a responder on the best N transmit sectors based on multi-dimensional QO reception at the responder: and selecting a sector based on the information from the responder. The method may include further repeating the second stage until N sectors have been selected.

In an embodiment, there is a method comprising: sending, from an initiator, an enhanced sector sweep (eSSW) frame for each sector; receiving, at the initiator, information from a responder on the best N transmit sectors based on multi-dimensional QO reception at the responder: and operating the initiator to estimate the channel by a method comprising: transmitting an orthogonal channel estimation field (CEF) to estimate elements of the channel; receiving complex parameters from the responder; constructing the channel; and performing multi-antenna transmission using the constructed channel.

In an embodiment, there is a transceiver configured to perform a method comprising: determining an estimate H_eff of an effective channel between the first transceiver and a second transceiver; calculating an optimal precoder F_opt based on the estimated effective channel; and select an analog precoder F_RF and a digital precoder F_BB to minimize the value of $\|F\_opt - F\_RF * F\_BB\|^2$.

In an embodiment, there is a first transceiver configured to perform a method comprising: selecting an analog precoder F_RF; given the analog precoder F_RF, determining an estimate H_eff of an effective channel between the first transceiver and a second transceiver; and selecting a digital precoder F_BB based on the effective channel H_eff.

In an embodiment, there is a user entity having a leaky wave antenna, the user entity being configured to perform a method comprising: receiving a multi-frequency training signal from a network entity at the leaky wave antenna; in the received training signal, identifying a frequency with a maximum amplitude; and determining an angle of arrival of the training signal based on the frequency with maximum amplitude.

In an embodiment, there is a network entity configured to perform a method comprising: configuring an antenna to generate a frequency scanning antenna pattern; transmitting a multi-frequency training signal from the antenna: receiving, from at least one user entity, information identifying the strongest frequency received by the user entity from the multi-frequency training signal; and determining a direction of the user entity from the identified strongest frequency.

In an embodiment, there is a network entity configured to perform a sector level sweep method comprising: sending, from an initiator, an enhanced sector sweep (eSSW) frame for each sector; receiving, at the initiator, information from a responder on the best N transmit sectors based on multi-dimensional QO reception at the responder; and setting the N best beams at the initiator.

In an embodiment, there is a network entity configured to perform multi-stage sector level sweep method comprising: in a first stage: sending, from an initiator, an enhanced sector sweep (eSSW) frame for each sector; receiving, at the initiator, information from a responder on the best N transmit sectors based on multi-dimensional QO reception at the responder; and selecting a sector based on the information from the responder. In a second stage, the method comprises: sending, from the initiator, an enhanced sector sweep (eSSW) frame with orthogonal Channel Estimation Fields with the sector chosen in the first stage fixed while sweeping all other sectors: receiving, at the initiator, information from a responder on the best N transmit sectors based on multi-dimensional QO reception at the responder; and selecting a sector based on the information from the responder.

In an embodiment, there is a network entity configured to perform a method comprising: sending, from an initiator, an enhanced sector sweep (eSSW) frame for each sector: receiving, at the initiator, information from a responder on the best N transmit sectors based on multi-dimensional QO reception at the responder; and operating the initiator to estimate the channel by a method comprising: transmitting an orthogonal channel estimation field (CEF) to estimate elements of the channel: receiving complex parameters from the responder; constructing the channel: and performing multi-antenna transmission using the constructed channel.

In an embodiment, there is a method comprising signaling by a STA an indication of whether the STA supports hybrid beamforming (HB). The method may include further signaling by the STA at least one of: maximum number of transmit data stream supported; maximum number of receive data stream supported; number of transmit and receive antenna; closed-loop baseband precoding supported;

open-loop baseband precoding supported; and antenna/polarization selection supported.

In an embodiment, there is a hybrid beamforming (HB) negotiation method comprising: exchanging information in HB capabilities between an initiator and a responder; setting up HB for upcoming MIMO transmission between the initiator and responder; and performing baseband beamforming training and feedback between the initiator and responder.

In an embodiment, there is a method of obtaining baseband channel information at a transmitter for hybrid precoding, comprising: requesting a channel during SU-MIMO beamforming setup by requesting feedback of a time domain channel response in a SC mode or a frequency domain channel response in a OFDM mode from a responder to a transmitter during a MIMO phase of the SU-MIMO beamforming setup. The method may include wherein the responder is configured as decision maker for a responder link, and an initiator MIMO BF feedback frame contains SU-MIMO beamforming training feedback for the responder's SMBT subphase in the form of time domain channel feedback in the SC mode or frequency domain channel feedback in the OFDM mode. The method may include wherein the transmitter is configured as decision maker for an initiator link, and a responder MIMO BF feedback frame contains SU-MIMO beamforming training feedback for the initiator's SMBT subphase in the form of time domain channel feedback in the SC mode or frequency domain channel feedback in the OFDM mode.

In an embodiment, there is a method of obtaining baseband channel information at a transmitter for hybrid precoding, comprising: requesting a channel during MU-MIMO beamforming setup by requesting feedback of a time domain channel response in a SC mode or a frequency domain channel response in a OFDM mode from a responder to a transmitter during a MIMO phase of the MU-MIMO beamforming setup. The method may include wherein a MIMO BF Feedback frame feeds back the time domain channel response in the SC mode or frequency domain channel feedback in the OFDM mode in addition to an associated quality to support hybrid beamforming. The method may include wherein a MU-MIMO BF Feedback frame contains MU-MIMO beamforming training feedback in the form of time domain channel feedback in the SC mode or frequency domain channel feedback in the OFDM mode.

In an embodiment, there is a method of obtaining baseband channel information at a transmitter for hybrid precoding, comprising: a transmitter requesting from a receiver baseband channel information for a channel during data transmission using either analog tracking or digital baseband tracking by requesting estimation of a time domain channel response in a SC mode or frequency domain channel response in a OFDM mode; and the transmitter receiving from the receiver feedback of the channel from the transmitter. The method may include wherein the channel is measured by using an EDMG initiator transmit beam tracking procedure.

In an embodiment, there is a method of obtaining baseband channel information at a transmitter for hybrid precoding, comprising: a transmitter requesting from a receiver baseband channel information for a channel during data transmission using either analog tracking or digital baseband tracking by requesting estimation of a time domain channel response in a SC mode or frequency domain channel response in a OFDM mode; and the transmitter receiving from the receiver feedback of the reverse channel to the transmitter. The method may include wherein the channel is measured by using either EDMG responder transmit beam tracking or EDMG initiator receive beam tracking. The method may include wherein the received feedback comprises a tracking packet, and further comprising the transmitter estimating a receive beam based at least in part on the received tracking packet.

Notes on Embodiments

Although features and elements are described as exemplary embodiments with particular combinations, each feature or element may be used alone or in various combinations without the other features or elements of the exemplary embodiments. Although the exemplary embodiments discuss 802.11's specific protocols, other wireless protocols and systems are applicable to each exemplary embodiment.

The invention claimed is:

1. A hybrid beamforming (HB) negotiation method comprising:
   receiving, by an initiator from at least a first responder, at least one frame comprising capability information of the first responder,
   wherein the at least one frame comprises a first subfield indicating polarization capability information of the first responder, a second subfield indicating whether HB is supported during Multi-User Multiple-Input and Multiple-Output (MU-MIMO) transmissions, and a third subfield indicating whether the HB is supported during Single-User Multiple-Input and Multiple-Output (SU-MIMO) transmissions,
   wherein the second subfield comprises a first one-bit indicator to indicate whether the HB is supported during the MU-MIMO transmissions, and wherein the third subfield comprises a second, separate one-bit indicator to indicate whether the HB is supported during the SU-MIMO transmissions;
   setting up, by the initiator, the HB in accordance with the capability information, for at least one upcoming Multiple-Input and Multiple-Output (MIMO) transmission between the initiator and at least the first responder, wherein the setting up of the HB for the at least one upcoming MIMO transmission between the initiator and at least the first responder includes transmitting, by the initiator to at least the first responder, another frame indicating an intention to use the HB in the at least one upcoming MIMO transmission; and
   performing, by the initiator with at least the first responder, baseband HB training and feedback.

2. The method of claim 1, wherein:
   the at least one frame is one or more MIMO setup frames or one or more MIMO feedback frames; and
   the capability information is carried by the one or more MIMO setup frames or by the one or more MIMO feedback frames.

3. The method of claim 1, wherein the setting up of the HB for the at least one upcoming MIMO transmission between the initiator and at least the first responder comprises:
   receiving, by the initiator, a confirmation from at least the first responder of use of the HB in the at least one upcoming MIMO transmission.

4. The method of claim 3, further comprising excluding, by the initiator, a second responder rejecting the use of the HB in the at least one upcoming MIMO transmission from a group of responders to be transmitted to by the initiator during the HB in the at least one upcoming MIMO transmission.

5. The method of claim 1, wherein the another frame comprises antenna configuration information, and the antenna configuration information comprises polarization information and any of: (1) antenna selection information; (2) closed-loop precoding information; or (3) open-loop precoding information.

6. The method of claim 5, wherein the antenna configuration information includes baseband precoding type information which is signaled in common among a plurality of responders.

7. The method of claim 1, wherein the setting up of the HB for the at least one upcoming MIMO transmission between the initiator and at least the first responder includes transmitting, by the initiator to at least the first responder, a requested feedback type.

8. The method of claim 1, wherein the performing of the baseband HB training and feedback comprises:
transmitting, by the initiator, one or more MU-MIMO feedback poll frames to at least the first responder; and
receiving, by the initiator, one or more MU-MIMO feedback frames from at least the first responder.

9. The method of claim 1, further comprising, receiving, by the initiator from the first responder and a second responder, feedback frames at distinct times, responsive to feedback poll frames transmitted by the initiator.

10. The method of claim 1, further comprising, receiving, by the initiator from the first responder and a second responder, MIMO feedback frames simultaneously during a polling time, wherein the MU-MIMO feedback frames are received over separate frequencies.

11. The method of claim 1, wherein the setting up of the HB for an upcoming MIMO transmission between the initiator and at least the first responder comprises configuring a hybrid precoder at the initiator for transmission of N streams to at least the first responder, by:
performing a transmit sector sweep by sending an enhanced sector sweep frame for each of a plurality of sectors;
receiving at the initiator, from the at least the first responder, feedback identifying the best N sectors from among the plurality of sectors;
based on the identified best N sectors, selecting an analog precoder;
determining an effective channel based on the selected analog precoder;
selecting a baseband precoder based on the determined effective channel; and
transmitting data to at least the first responder using the selected analog precoder and the selected baseband precoder.

12. An initiator configured for Hybrid Beamforming (HB) negotiation, the initiator comprising:
a transmit/receive unit configured to receive, from at least a first responder, at least one frame comprising capability information of the first responder,
wherein the at least one frame comprises a first subfield indicating polarization capability information of the first responder, a second subfield indicating whether HB is supported during Multi-User Multiple-Input and Multiple-Output (MU-MIMO) transmissions, and a third subfield indicating whether the HB is supported during Single-User Multiple-Input and Multiple-Output (SU-MIMO) transmissions,
wherein the second subfield comprises a first one-bit indicator to indicate whether the HB is supported during the MU-MIMO transmissions, and wherein the third subfield comprises a second, separate one-bit indicator to indicate whether the HB is supported during the SU-MIMO transmissions; and
a processor configured to set up the HB, in accordance with the capability information, for at least one upcoming Multiple-Input and Multiple-Output (MIMO) transmission between the initiator and at least the first responder,
wherein the transmit/receive unit is configured to transmit, to at least the first responder, another frame indicating an intention to use the HB in the at least one upcoming MIMO transmission; and
wherein the processor is configured to perform, with at least the first responder, baseband HB training and feedback.

13. The initiator of claim 12, wherein:
the at least one frame is one or more MIMO setup frames or one or more MIMO feedback frames; and
the capability information is carried by the one or more MIMO setup frames or by the one or more MIMO feedback frames.

14. The initiator of claim 12, wherein the initiator is configured to:
receive a confirmation from at least the first responder of the use of the HB in the at least one upcoming MIMO transmission.

15. The initiator of claim 14, wherein the initiator is configured to:
exclude a second responder rejecting the use of the HB in the at least one upcoming MIMO transmission from a group of responders to be transmitted to by the initiator during the HB in the at least one upcoming MIMO transmission.

16. The initiator of claim 12, wherein the another frame indicates antenna configuration information, and wherein the antenna configuration information includes polarization information and any of: (1) antenna selection information; (2) closed-loop precoding information; or (3) open-loop precoding information.

17. The initiator of claim 16, wherein the antenna configuration information includes baseband precoding type information which is signaled as in common among a plurality of responders.

18. The initiator of claim 12, wherein the transmit/receive unit is configured to transmit, to at least the first responder, a requested feedback type.

19. The initiator of claim 12, wherein the transmit/receive unit is configured to:
transmit one or more MU-MIMO feedback poll frames to at least the first responder; and
receive one or more MU-MIMO feedback frames from at least the first responder.

20. The initiator of claim 12, wherein the transmit/receive unit is configured to:
receive, from the first responder and a second responder, feedback frames at distinct times, responsive to feedback poll frames transmitted by the initiator.

* * * * *